United States Patent
Liu et al.

(10) Patent No.: US 10,116,358 B2
(45) Date of Patent: Oct. 30, 2018

(54) SERVICE SIGNAL PROCESSING METHOD AND APPARATUS, AND CUSTOMER-PREMISES EQUIPMENT

(71) Applicant: Huawei Technologies Co., Ltd., Shenzhen (CN)

(72) Inventors: Bing Liu, Xi'an (CN); Jingya Wen, Xi'an (CN); Dingjie Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 38 days.

(21) Appl. No.: 15/513,390
(22) PCT Filed: Sep. 22, 2014
(86) PCT No.: PCT/CN2014/087087
§ 371 (c)(1),
(2) Date: Mar. 22, 2017
(87) PCT Pub. No.: WO2016/044977
PCT Pub. Date: Mar. 31, 2016

(65) Prior Publication Data
US 2017/0310370 A1 Oct. 26, 2017

(51) Int. Cl.
| | |
|---|---|
| *H04B 7/04* | (2017.01) |
| *H04B 7/0404* | (2017.01) |
| *H04W 48/16* | (2009.01) |
| *H04B 7/06* | (2006.01) |
| *H04W 88/06* | (2009.01) |

(52) U.S. Cl.
CPC ......... *H04B 7/0404* (2013.01); *H04B 7/0608* (2013.01); *H04W 48/16* (2013.01); *H04W 88/06* (2013.01)

(58) Field of Classification Search
CPC ... H04B 7/0404; H04B 7/0608; H04W 48/16; H04W 88/06
See application file for complete search history.

(56) References Cited

U.S. PATENT DOCUMENTS

| | | | | |
|---|---|---|---|---|
| 8,295,858 | B2 * | 10/2012 | Fox | H04K 3/65 455/456.4 |
| 9,967,897 | B2 * | 5/2018 | Ko | H04W 28/04 |

(Continued)

FOREIGN PATENT DOCUMENTS

| | | |
|---|---|---|
| CN | 101951691 A | 1/2011 |
| CN | 102364979 A | 2/2012 |

(Continued)

OTHER PUBLICATIONS

Machine Translation and Abstract of International Publication No. WO2012034387, Mar. 22, 2012, 15 pages.

(Continued)

*Primary Examiner* — Sharad Rampuria
(74) *Attorney, Agent, or Firm* — Conley Rose, P.C.

(57) ABSTRACT

A service signal processing method includes obtaining signal strength information of a current service antenna, and obtaining signal strength information of another service antenna; selecting a working antenna according to the signal strength information of the current service antenna and the signal strength information of the another service antenna; and controlling the working antenna to process a service signal of a current service using a radio frequency channel of the current service antenna. The working antenna determined according to the signal strength information of the current service antenna and the signal strength information of the another service antenna may be the current service antenna or may be the another service antenna. When multiple working antennas are determined, the working antennas may process a same service or may process different services.

8 Claims, 10 Drawing Sheets

(56) References Cited

U.S. PATENT DOCUMENTS

| | | | |
|---|---|---|---|
| 2007/0026827 A1 | 2/2007 | Miyano et al. | |
| 2008/0238807 A1* | 10/2008 | Ibrahim | H01Q 21/29 343/876 |
| 2012/0302188 A1 | 11/2012 | Sahota et al. | |
| 2015/0180556 A1 | 6/2015 | Hooli et al. | |
| 2016/0241675 A1* | 8/2016 | Feng | H04W 76/10 |

FOREIGN PATENT DOCUMENTS

| | | |
|---|---|---|
| CN | 103428898 A | 12/2013 |
| CN | 103945499 A | 7/2014 |
| EP | 1713291 A1 | 10/2006 |
| EP | 2234276 A2 | 9/2010 |
| JP | 2005295516 A | 10/2005 |
| RU | 2488964 C2 | 7/2013 |
| WO | 2012034387 A1 | 3/2012 |
| WO | 2013022702 A1 | 2/2013 |
| WO | 2013060237 A1 | 5/2013 |
| WO | 2014161266 A1 | 10/2014 |

OTHER PUBLICATIONS

Machine Translation and Abstract of International Publication No. WO2013060237, May 2, 2013, 11 pages.

Machine Translation and Abstract of International Publication No. WO2014161266, Oct. 9, 2014, 9 pages.

Foreign Communication From a Counterpart Application, Korean Application No. 10-2017-7010110, Korean Notice of Allowance and Brief Translation dated Jan. 22, 2018, 3 pages.

Foreign Communication From a Counterpart Application, Chinese Application No. 2017113224, Chinese Office Action and Brief Translation dated May 29, 2018, 10 pages.

Machine Translation and Abstract of Chinese Publication No. CN101951691, Jan. 19, 2011, 12 pages.

Machine Translation and Abstract of Chinese Publication No. CN102364979, Feb. 29, 2012, 10 pages.

Machine Translation and Abstract of Chinese Publication No. CN103945499, Jul. 23, 2014, 11 pages.

Foreign Communication From a Counterpart Application, PCT Application No. PCT/CN2014/087087, English Translation of International Search Report dated Jul. 3, 2015, 2 pages.

Foreign Communication From a Counterpart Application, PCT Application No. PCT/CN2014/087087, English Translation of Written Opinion dated Jul. 3, 2015, 5 pages.

Foreign Communication From a Counterpart Application, Japanese Application No. 2017-515730, Japanese Office Action dated Apr. 3, 2018, 3 pages.

Foreign Communication From a Counterpart Application, European Application No. 14902332.7, Extended European Search Report dated Aug. 18, 2017, 10 pages.

\* cited by examiner

SERVICE SIGNAL PROCESSING METHOD AND APPARATUS, AND CUSTOMER-PREMISES EQUIPMENT

CROSS-REFERENCE TO RELATED APPLICATION

This application is a national stage of International Patent Application No. PCT/CN2014/087087, filed on Sep. 22, 2014, which is hereby incorporated by reference in its entirety.

TECHNICAL FIELD

The present disclosure relates to the antenna field, and in particular, to a service signal processing method and apparatus, and customer-premises equipment.

BACKGROUND

With rapid development of wireless communications technologies, there is more customer-premises equipment (CPE) that can receive/send both a hotspot signal and a mobile-network signal. Usually, to receive/send both a hotspot signal and a mobile-network signal, a hotspot antenna and a mobile-network antenna are respectively disposed in the CPE. To process service signals of various services supported by the CPE, during service signal processing in a related technology, a commonly used method is a current service of the CPE is determined, a current service antenna corresponding to the current service is used as a working antenna to process a service signal of the current service, and the working antenna is controlled to process the service signal of the current service using a radio frequency channel of the current service antenna. During service signal processing in the related technology, it is required to determine the current service antenna as the working antenna with reference to the current service of the CPE, so as to control the working antenna to process the service signal of the current service using the radio frequency channel of the current service antenna.

The related technology has the following disadvantages.

During service signal processing in the related technology, the current service antenna is determined as the working antenna with reference to the current service of the CPE, and the working antenna is controlled to process the service signal of the current service using the radio frequency channel of the current service antenna. In this case, not only a manner in which the working antennas processes the service signal of the current service is not flexible, but also the service signal cannot be fast processed normally due to poor signal strength of the current service antenna. Consequently, service processing is impeded, a service processing rate is not high, or the like.

SUMMARY

To resolve a problem, embodiments of the present disclosure provide a service signal processing method and apparatus, and customer-premises equipment. The technical solutions are as follows.

According to a first aspect, a service signal processing method is provided, where the method is applied to CPE and includes obtaining signal strength information of a current service antenna corresponding to a current service; obtaining a first idle timeslot of a current-service signal frame structure and a second idle timeslot of another-service signal frame structure; obtaining a synchronization moment of the first idle timeslot and the second idle timeslot; controlling the current service antenna to be disconnected from a radio frequency channel of the current service antenna; controlling another service antenna corresponding to another service to be switched to the radio frequency channel of the current service antenna at the obtained synchronization moment, and then receive/send a test signal; controlling the another service antenna to be disconnected from the radio frequency channel of the current service antenna, and controlling the current service antenna to be switched back to the radio frequency channel of the current service antenna; determining signal strength information of the another service antenna according to a receiving/sending result of the test signal; selecting a working antenna according to the signal strength information of the current service antenna and the signal strength information of the another service antenna; and controlling the working antenna to process a service signal of the current service using the radio frequency channel of the current service antenna.

With reference to the first aspect, in a first possible implementation manner of the first aspect, if the current-service signal frame structure has a receive-send interval, and the another-service signal frame structure has a receive-send interval, the obtaining a first idle timeslot of a current-service signal frame structure and a second idle timeslot of another-service signal frame structure includes determining a first receive-send interval of the current-service signal frame structure, and using the first receive-send interval as the first idle timeslot of the current-service signal frame structure; and determining a second receive-send interval of the another-service signal frame structure, and using the second receive-send interval as the second idle timeslot of the another-service signal frame structure; and the obtaining a synchronization moment of the first idle timeslot and the second idle timeslot includes obtaining a synchronization moment of the first receive-send interval and the second receive-send interval, and using the synchronization moment of the first receive-send interval and the second receive-send interval as the synchronization moment of the first idle timeslot and the second idle timeslot.

With reference to the first aspect, in a second possible implementation manner of the first aspect, if the current-service signal frame structure has a receive-send interval, but the another-service signal frame structure does not have a receive-send interval, the obtaining a first idle timeslot of a current-service signal frame structure and a second idle timeslot of another-service signal frame structure includes determining a third receive-send interval of the current-service signal frame structure, and using the third receive-send interval as the first idle timeslot of the current-service signal frame structure; and determining a first blank subframe in the another-service signal frame structure, and using the first blank subframe as the second idle timeslot of the another-service signal frame structure; and the obtaining a synchronization moment of the first idle timeslot and the second idle timeslot includes searching the first blank subframe for a synchronization moment with the third receive-send interval, and using the found synchronization moment as the synchronization moment of the first idle timeslot and the second idle timeslot.

With reference to the first aspect, in a third possible implementation manner of the first aspect, if the current-service signal frame structure does not have a receive-send interval, but the another-service signal frame structure has a receive-send interval, the obtaining a first idle timeslot of a current-service signal frame structure and a second idle timeslot of another-service signal frame structure includes determining a second blank subframe in the current-service signal frame structure, and using the second blank subframe as the first idle timeslot of the current-service signal frame structure; and determining a fourth receive-send interval of the another-service signal frame structure, and using the fourth receive-send interval as the second idle timeslot of the another-service signal frame structure; and the obtaining a synchronization moment of the first idle timeslot and the second idle timeslot includes searching the second blank subframe for a synchronization moment with the fourth receive-send interval, and using the found synchronization moment as the synchronization moment of the first idle timeslot and the second idle timeslot.

With reference to the first aspect, in a fourth possible implementation manner of the first aspect, if the current-service signal frame structure does not have a receive-send interval, and the another-service signal frame structure does not have a receive-send interval, the obtaining a first idle timeslot of a current-service signal frame structure and a second idle timeslot of another-service signal frame structure includes determining a third blank subframe in the current-service signal frame structure, and using the third blank subframe as the first idle timeslot of the current-service signal frame structure; and determining a fourth blank subframe in the another-service signal frame structure, and using the fourth blank subframe as the second idle timeslot of the another-service signal frame structure; and the obtaining a synchronization moment of the first idle timeslot and the second idle timeslot includes determining a synchronization moment of the third blank subframe and the fourth blank subframe, and using the synchronization moment of the third blank subframe and the fourth blank subframe as the synchronization moment of the first idle timeslot and the second idle timeslot.

With reference to the first aspect, in a fifth possible implementation manner of the first aspect, before the controlling the working antenna to process a service signal of the current service using the radio frequency channel of the current service antenna, the method further includes, if the working antenna is not the current service antenna, controlling the current service antenna to be disconnected from the radio frequency channel of the current service antenna, and controlling the working antenna to be switched to the radio frequency channel of the current service antenna.

With reference to the fifth possible implementation manner of the first aspect, in a sixth possible implementation manner of the first aspect, before the controlling the working antenna to be switched to the radio frequency channel of the current service antenna, the method further includes determining whether the working antenna meets a switching condition; and if the working antenna meets the switching condition, performing the step of controlling the working antenna to be switched to the radio frequency channel of the current service antenna.

With reference to the first aspect, in a seventh possible implementation manner of the first aspect, after the selecting a working antenna according to the signal strength information of the current service antenna and the signal strength information of the another service antenna, the method further includes regularly polling the signal strength information of the current service antenna and the signal strength information of the another service antenna; and updating, according to the signal strength information of the current service antenna and the signal strength information of the another service antenna that are obtained by means of polling, the working antenna that processes the service signal of the current service.

According to a second aspect, a service signal processing apparatus is further provided, where the apparatus is applied to CPE and includes a first obtaining module configured to obtain signal strength information of a current service antenna corresponding to a current service; a second obtaining module configured to obtain a first idle timeslot of a current-service signal frame structure and a second idle timeslot of another-service signal frame structure; a third obtaining module configured to obtain a synchronization moment of the first idle timeslot and the second idle timeslot; a first control module configured to control the current service antenna to be disconnected from a radio frequency channel of the current service antenna; a second control module configured to control another service antenna corresponding to another service to be switched to the radio frequency channel of the current service antenna at the obtained synchronization moment, and then receive/send a test signal; a third control module configured to control the another service antenna to be disconnected from the radio frequency channel of the current service antenna; a fourth control module configured to control the current service antenna to be switched back to the radio frequency channel of the current service antenna; a first determining module configured to determine signal strength information of the another service antenna according to a receiving/sending result of the test signal; a selection module configured to select a working antenna according to the signal strength information of the current service antenna and the signal strength information of the another service antenna; and a fifth control module configured to control the working antenna to process a service signal of the current service using the radio frequency channel of the current service antenna.

With reference to the second aspect, in a first possible implementation manner of the second aspect, if the current-service signal frame structure has a receive-send interval, and the another-service signal frame structure has a receive-send interval, the second obtaining module includes a first determining unit configured to determine a first receive-send interval of the current-service signal frame structure, and use the first receive-send interval as the first idle timeslot of the current-service signal frame structure; and a second determining unit configured to determine a second receive-send interval of the another-service signal frame structure, and use the second receive-send interval as the second idle timeslot of the another-service signal frame structure; and the third obtaining module includes a first obtaining unit configured to obtain a synchronization moment of the first receive-send interval and the second receive-send interval, and use the synchronization moment of the first receive-send interval and the second receive-send interval as the synchronization moment of the first idle timeslot and the second idle timeslot.

With reference to the second aspect, in a second possible implementation manner of the second aspect, if the current-service signal frame structure has a receive-send interval, but the another-service signal frame structure does not have a receive-send interval, the second obtaining module includes a third determining unit configured to determine a third receive-send interval of the current-service signal frame structure, and use the third receive-send interval as the first idle timeslot of the current-service signal frame structure; and a fourth determining unit configured to determine a first blank subframe in the another-service signal frame structure, and use the first blank subframe as the second idle timeslot of the another-service signal frame structure; and the third obtaining module includes a first searching unit configured to search the first blank subframe for a synchronization moment with the third receive-send interval, and use the found synchronization moment as the synchronization moment of the first idle timeslot and the second idle timeslot.

With reference to the second aspect, in a third possible implementation manner of the second aspect, if the current-service signal frame structure does not have a receive-send interval, but the another-service signal frame structure has a receive-send interval, the second obtaining module includes a fifth determining unit configured to determine a second blank subframe in the current-service signal frame structure, and use the second blank subframe as the first idle timeslot of the current-service signal frame structure; and a sixth determining unit configured to determine a fourth receive-send interval of the another-service signal frame structure, and use the fourth receive-send interval as the second idle timeslot of the another-service signal frame structure; and the third obtaining module includes a second searching unit configured to search the second blank subframe for a synchronization moment with the fourth receive-send interval, and use the found synchronization moment as the synchronization moment of the first idle timeslot and the second idle timeslot.

With reference to the second aspect, in a fourth possible implementation manner of the second aspect, if the current-service signal frame structure does not have a receive-send interval, and the another-service signal frame structure does not have a receive-send interval, the second obtaining module includes a seventh determining unit configured to determine a third blank subframe in the current-service signal frame structure, and use the third blank subframe as the first idle timeslot of the current-service signal frame structure; and an eighth determining unit configured to determine a fourth blank subframe in the another-service signal frame structure, and use the fourth blank subframe as the second idle timeslot of the another-service signal frame structure; and the third obtaining module includes a ninth determining unit configured to determine a synchronization moment of the third blank subframe and the fourth blank subframe, and use the synchronization moment of the third blank subframe and the fourth blank subframe as the synchronization moment of the first idle timeslot and the second idle timeslot.

With reference to the second aspect, in a fifth possible implementation manner of the second aspect, the apparatus further includes a sixth control module configured to, when the working antenna is not the current service antenna, control the current service antenna to be disconnected from the radio frequency channel of the current service antenna, and control the working antenna to be switched to the radio frequency channel of the current service antenna.

With reference to the fifth possible implementation manner of the second aspect, in a sixth possible implementation manner of the second aspect, the apparatus further includes a second determining module configured to determine whether the working antenna meets a switching condition; and the sixth control module is configured to, when the working antenna meets the switching condition, control the working antenna to be switched to the radio frequency channel of the current service antenna.

With reference to the second aspect, in a seventh possible implementation manner of the second aspect, the apparatus further includes a polling module configured to regularly poll the signal strength information of the current service antenna and the signal strength information of the another service antenna; and an update module configured to update, according to the signal strength information of the current service antenna and the signal strength information of the another service antenna that are obtained by means of polling, the working antenna that processes the service signal of the current service.

According to a third aspect, customer-premises equipment is further provided, where the customer-premises equipment includes a processor and a memory configured to store an executable instruction of the processor; the processor is configured to obtain signal strength information of a current service antenna corresponding to a current service; obtain a first idle timeslot of a current-service signal frame structure and a second idle timeslot of another-service signal frame structure; obtain a synchronization moment of the first idle timeslot and the second idle timeslot; control the current service antenna to be disconnected from a radio frequency channel of the current service antenna; control another service antenna corresponding to another service to be switched to the radio frequency channel of the current service antenna at the obtained synchronization moment, and then receive/send a test signal; control the another service antenna to be disconnected from the radio frequency channel of the current service antenna, and control the current service antenna to be switched back to the radio frequency channel of the current service antenna; determine signal strength information of the another service antenna according to a receiving/sending result of the test signal; select a working antenna according to the signal strength information of the current service antenna and the signal strength information of the another service antenna; and control the working antenna to process a service signal of the current service using the radio frequency channel of the current service antenna.

With reference to the third aspect, in a first possible implementation manner of the third aspect, if the current-service signal frame structure has a receive-send interval, and the another-service signal frame structure has a receive-send interval, the processor is further configured to determine a first receive-send interval of the current-service signal frame structure, and use the first receive-send interval as the first idle timeslot of the current-service signal frame structure; determine a second receive-send interval of the another-service signal frame structure, and use the second receive-send interval as the second idle timeslot of the another-service signal frame structure; and obtain a synchronization moment of the first receive-send interval and the second receive-send interval, and use the synchronization moment of the first receive-send interval and the second receive-send interval as the synchronization moment of the first idle timeslot and the second idle timeslot.

With reference to the third aspect, in a second possible implementation manner of the third aspect, if the current-service signal frame structure has a receive-send interval, but the another-service signal frame structure does not have a receive-send interval, the processor is further configured to determine a third receive-send interval of the current-service signal frame structure, and use the third receive-send interval as the first idle timeslot of the current-service signal frame structure; determine a first blank subframe in the another-service signal frame structure, and use the first blank subframe as the second idle timeslot of the another-service signal frame structure; and search the first blank subframe for a synchronization moment with the third receive-send interval, and use the found synchronization moment as the synchronization moment of the first idle timeslot and the second idle timeslot.

With reference to the third aspect, in a third possible implementation manner of the third aspect, if the current-service signal frame structure does not have a receive-send interval, but the another-service signal frame structure has a receive-send interval, the processor is further configured to determine a second blank subframe in the current-service signal frame structure, and use the second blank subframe as the first idle timeslot of the current-service signal frame structure; determine a fourth receive-send interval of the another-service signal frame structure, and use the fourth receive-send interval as the second idle timeslot of the another-service signal frame structure; and search the second blank subframe for a synchronization moment with the fourth receive-send interval, and use the found synchronization moment as the synchronization moment of the first idle timeslot and the second idle timeslot.

With reference to the third aspect, in a fourth possible implementation manner of the third aspect, if the current-service signal frame structure does not have a receive-send interval, and the another-service signal frame structure does not have a receive-send interval, the processor is further configured to determine a third blank subframe in the current-service signal frame structure, and use the third blank subframe as the first idle timeslot of the current-service signal frame structure; determine a fourth blank subframe in the another-service signal frame structure, and use the fourth blank subframe as the second idle timeslot of the another-service signal frame structure; and determine a synchronization moment of the third blank subframe and the fourth blank subframe, and use the synchronization moment of the third blank subframe and the fourth blank subframe as the synchronization moment of the first idle timeslot and the second idle timeslot.

With reference to the third aspect, in a fifth possible implementation manner of the third aspect, the processor is further configured to, if the working antenna is not the current service antenna, control the current service antenna to be disconnected from the radio frequency channel of the current service antenna, and control the working antenna to be switched to the radio frequency channel of the current service antenna.

With reference to the fifth possible implementation manner of the third aspect, in a sixth possible implementation manner of the third aspect, the processor is further configured to determine whether the working antenna meets a switching condition; and if the working antenna meets the switching condition, control the working antenna to be switched to the radio frequency channel of the current service antenna.

With reference to the third aspect, in a seventh possible implementation manner of the third aspect, the processor is further configured to regularly poll the signal strength information of the current service antenna and the signal strength information of the another service antenna; and update, according to the signal strength information of the current service antenna and the signal strength information of the another service antenna that are obtained by means of polling, the working antenna that processes the service signal of the current service.

Beneficial effects of the technical solutions provided in the embodiments of the present disclosure are as follows.

A working antenna is determined according to signal strength information of a current service antenna and signal strength information of another service antenna; the working antenna determined according to the signal strength information of the current service antenna and the signal strength information of the another service antenna may be the current service antenna or may be the another service antenna, and when multiple working antennas are determined, the working antennas may process a same service or may process different services. Therefore, not only a manner in which the working antenna processes a service signal of a current service is more flexible, but also it is ensured that a service antenna with good signal strength can be used as a working antenna, thereby increasing a service processing rate.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the present disclosure clearer, the following further describes the embodiments of the present disclosure in detail with reference to the accompanying drawings.

Figure 1:
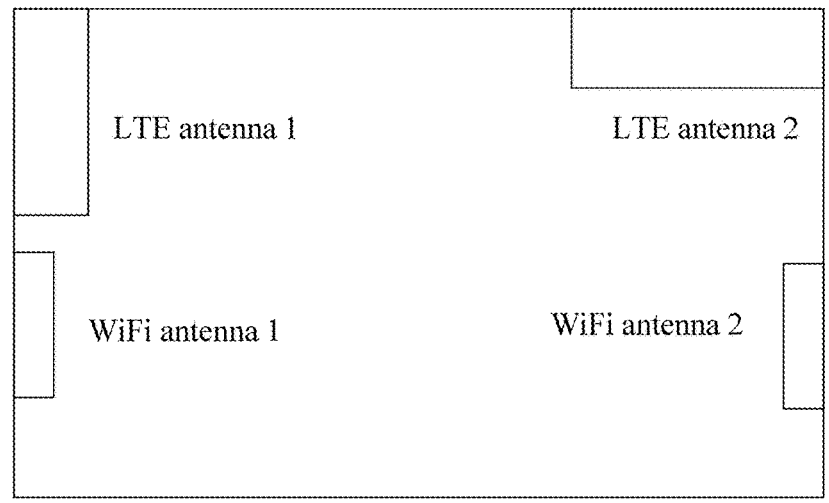
FIG. 1 is a schematic diagram of a layout of service antennas in CPE according to an embodiment of the present disclosure.

FIG. 1 shows a schematic diagram of a layout of service antennas in CPE according to an embodiment of the present disclosure. Usually, the CPE may include at least one hotspot antenna and at least one mobile-network antenna. For example, the CPE may include two WiFi antennas and two LTE antennas. For ease of description, as shown in FIG. 1, in this embodiment of the present disclosure, that the CPE includes two WiFi antennas and at least two LTE antennas is used as an example to explain this embodiment of the present disclosure. However, during specific implementation, another quantity of each type of service antennas may be used. For example, the CPE may include only one WiFi antenna and one LTE antenna. A mobile network service may be an LTE service or may be another service, such as a Code Division Multiple Access (CDMA) service or a Global System for Mobile Communications (GSM) service.

When the CPE includes two LTE antennas and two WiFi antennas, to ensure isolation between the primary/secondary LTE antennas, isolation between the primary/secondary WiFi antennas, isolation between the LTE antennas and the WiFi antennas, and coverage of directivity patterns of the antennas, usually an antenna layout shown in FIG. 1 is used. The two LTE antennas are separated from each other to the greatest extent and are respectively located in the upper left corner and the upper right corner of a board; the two WiFi antennas are respectively located on two sides of the board and are kept away from the LTE antennas as far as possible. With reference to a directivity pattern characteristic of an antenna, in a practical application process of the CPE, if only a current service antenna corresponding to a current service is used as a working antenna at one moment, and a service signal of the current service is processed using a radio frequency channel of the current service antenna, not only a manner in which the working antenna processes the service signal of the current service is not flexible, but also the service signal cannot be fast processed normally due to poor signal strength of the current service antenna; consequently, service processing is impeded or a service processing rate is not high. In addition, when being used as working antennas, service antennas of a same service may have relatively poor directivity pattern coverage or have relatively poor isolation. Therefore, it is likely to cause problems such as poor directivity, poor through-wall performance, and short-distance coverage of the antennas. For example, because the WiFi antennas disposed in the CPE have a poor directivity pattern in a vertical direction, the WiFi antennas have relatively poor through-wall performance, cannot meet network coverage of a skip-floor house or a villa, and the like.

Figure 2:
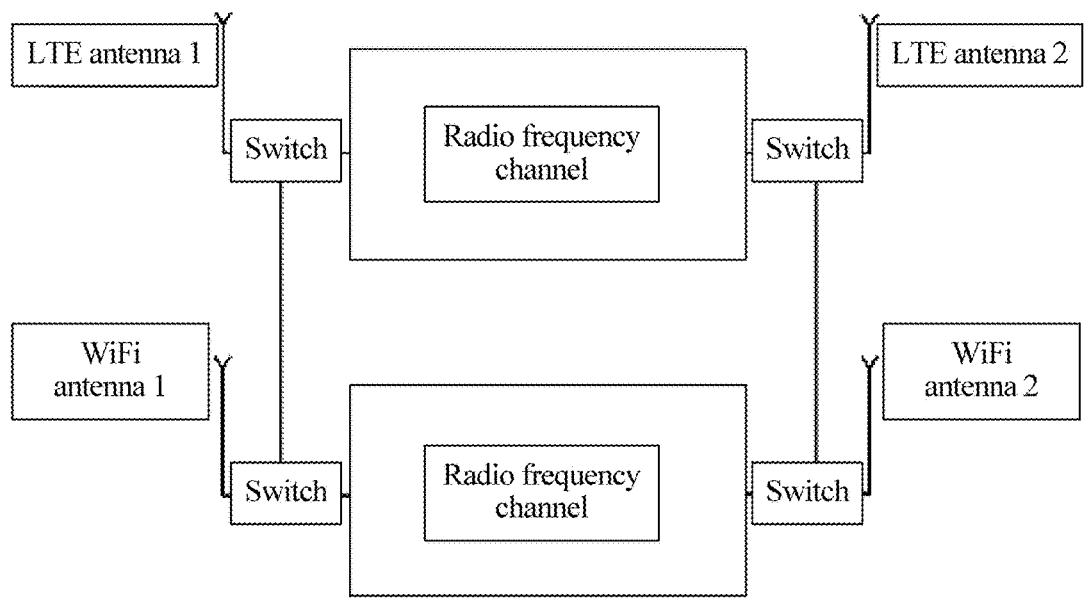
FIG. 2 is a schematic diagram of a relationship between a Wireless Fidelity (WiFi) antenna and a Long Term Evolution (LTE) antenna in CPE according to another embodiment of the present disclosure.

To resolve the foregoing problems, FIG. 2 shows a schematic diagram of a relationship between a WiFi antenna and an LTE antenna in CPE according to an embodiment of the present disclosure. As shown in FIG. 2, in the CPE, a switch or a combiner is disposed between a radio frequency channel of an LTE antenna and the LTE antenna and a WiFi antenna, and a switch or a combiner is disposed between a radio frequency channel of a WiFi antenna and an LTE antenna and the WiFi antenna. Therefore, during processing of a service signal of a current signal, a service antenna with good signal strength may be selected, according to signal strength information of service antennas in the CPE, as a working antenna to process the service signal of the current service. Each service antenna may be corresponding to one radio frequency channel.

In addition, in this embodiment of the present disclosure, a quantity of working antennas selected according to signal strength information of service antennas of services is related to a quantity of service antennas of each service included in the CPE. For example, if each service in the CPE includes only one service antenna, one service antenna may be selected from service antennas of the services as a working antenna during working antenna selection. If each service in the CPE includes at least two service antennas, at least two service antennas may be selected from service antennas of the services as working antennas during working antenna selection. When at least two service antennas are selected as working antennas, the working antennas may be service antennas of a same service or may be service antennas of different services. For example, the working antennas may be WiFi antennas, may be LTE antennas, or may include both an LTE antenna and a WiFi antenna. When the working antennas are service antennas of different services, the working antennas may be controlled, using a disposed switch or combiner, to be switched between radio frequency channels of current service antennas.

Further, to select a working antenna according to signal strength information of service antennas of services in the CPE, first the signal strength information of the service antennas of the services in the CPE needs to be obtained. After the working antenna is selected, the working antenna may be controlled to process the service signal of the current service using the radio frequency channel of the current service antenna. For details of a specific service signal processing method, refer to the following embodiments.

Figure 3:
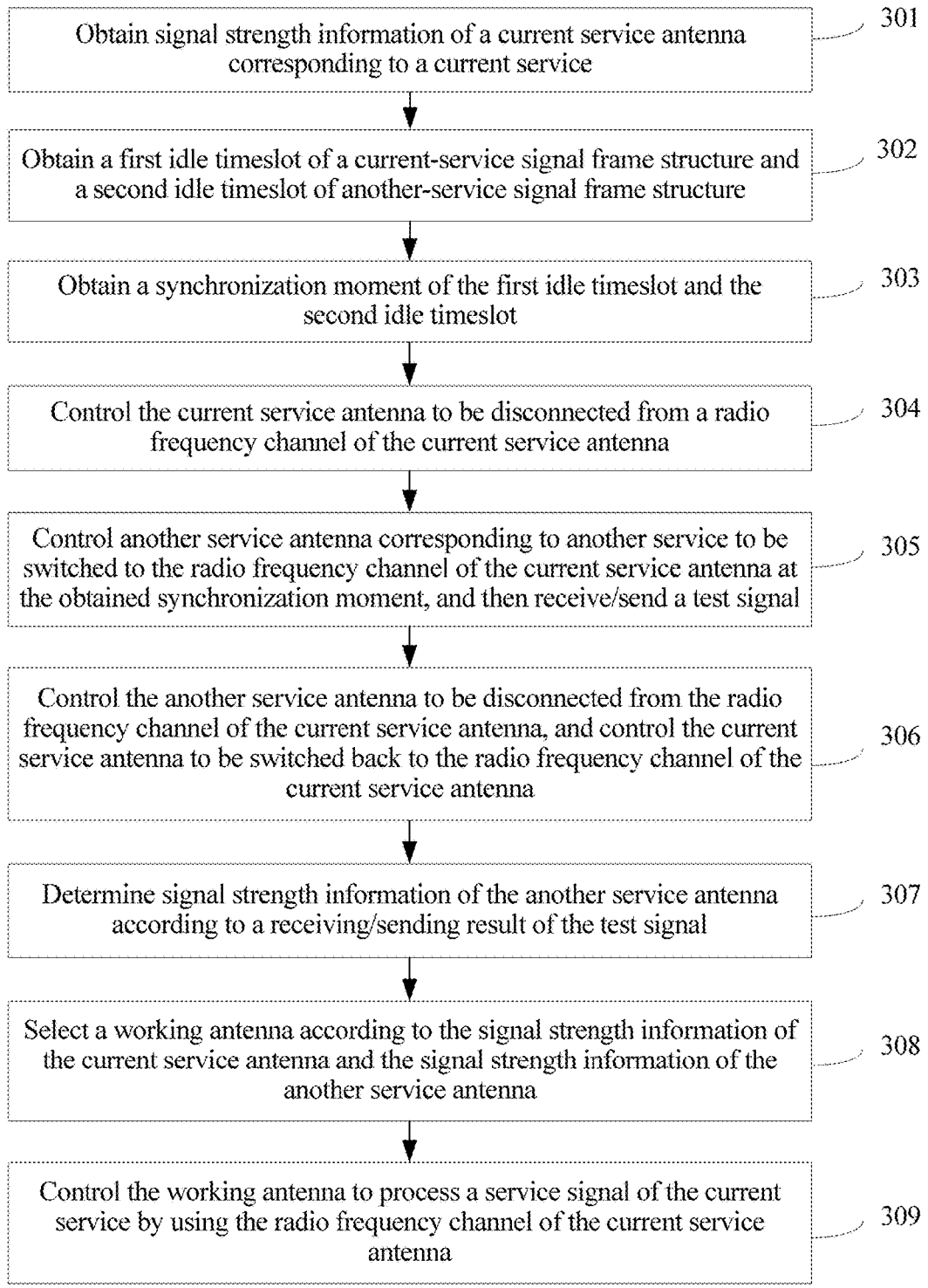
FIG. 3 is a flowchart of a service signal processing method according to another embodiment of the present disclosure.

FIG. 3 shows a flowchart of a service signal processing method according to an example embodiment, and the service signal processing method is applied to CPE. With reference to the schematic diagram of the layout of the service antennas in the CPE shown in FIG. 1, the schematic diagram of the relationship between the WiFi antenna and the LTE antenna in the CPE shown in FIG. 2, and the foregoing content, a method procedure provided in this embodiment of the present disclosure includes the following steps.

301. Obtain signal strength information of a current service antenna corresponding to a current service.

302. Obtain a first idle timeslot of a current-service signal frame structure and a second idle timeslot of another-service signal frame structure.

303. Obtain a synchronization moment of the first idle timeslot and the second idle timeslot.

304. Control the current service antenna to be disconnected from a radio frequency channel of the current service antenna.

305. Control another service antenna corresponding to another service to be switched to the radio frequency channel of the current service antenna at the obtained synchronization moment, and then receive/send a test signal.

306. Control the another service antenna to be disconnected from the radio frequency channel of the current service antenna, and control the current service antenna to be switched back to the radio frequency channel of the current service antenna.

307. Determine signal strength information of the another service antenna according to a receiving/sending result of the test signal.

308. Select a working antenna according to the signal strength information of the current service antenna and the signal strength information of the another service antenna.

309. Control the working antenna to process a service signal of the current service using the radio frequency channel of the current service antenna.

Optionally, if the current-service signal frame structure has a receive-send interval, and the another-service signal frame structure has a receive-send interval, the obtaining a first idle timeslot of a current-service signal frame structure and a second idle timeslot of another-service signal frame structure includes determining a first receive-send interval of the current-service signal frame structure, and using the first receive-send interval as the first idle timeslot of the current-service signal frame structure; and determining a second receive-send interval of the another-service signal frame structure, and using the second receive-send interval as the second idle timeslot of the another-service signal frame structure; and the obtaining a synchronization moment of the first idle timeslot and the second idle timeslot includes obtaining a synchronization moment of the first receive-send interval and the second receive-send interval, and using the synchronization moment of the first receive-send interval and the second receive-send interval as the synchronization moment of the first idle timeslot and the second idle timeslot.

Optionally, if the current-service signal frame structure has a receive-send interval, but the another-service signal frame structure does not have a receive-send interval, the obtaining a first idle timeslot of a current-service signal frame structure and a second idle timeslot of another-service signal frame structure includes determining a third receive-send interval of the current-service signal frame structure, and using the third receive-send interval as the first idle timeslot of the current-service signal frame structure; and determining a first blank subframe in the another-service signal frame structure, and using the first blank subframe as the second idle timeslot of the another-service signal frame structure; and the obtaining a synchronization moment of the first idle timeslot and the second idle timeslot includes searching the first blank subframe for a synchronization moment with the third receive-send interval, and using the found synchronization moment as the synchronization moment of the first idle timeslot and the second idle timeslot.

Optionally, if the current-service signal frame structure does not have a receive-send interval, but the another-service signal frame structure has a receive-send interval, the obtaining a first idle timeslot of a current-service signal frame structure and a second idle timeslot of another-service signal frame structure includes determining a second blank subframe in the current-service signal frame structure, and using the second blank subframe as the first idle timeslot of the current-service signal frame structure; and determining a fourth receive-send interval of the another-service signal frame structure, and using the fourth receive-send interval as the second idle timeslot of the another-service signal frame structure; and the obtaining a synchronization moment of the first idle timeslot and the second idle timeslot includes searching the second blank subframe for a synchronization moment with the fourth receive-send interval, and using the found synchronization moment as the synchronization moment of the first idle timeslot and the second idle timeslot.

Optionally, if the current-service signal frame structure does not have a receive-send interval, and the another-service signal frame structure does not have a receive-send interval, the obtaining a first idle timeslot of a current-service signal frame structure and a second idle timeslot of another-service signal frame structure includes determining a third blank subframe in the current-service signal frame structure, and using the third blank subframe as the first idle timeslot of the current-service signal frame structure; and determining a fourth blank subframe in the another-service signal frame structure, and using the fourth blank subframe as the second idle timeslot of the another-service signal frame structure; and the obtaining a synchronization moment of the first idle timeslot and the second idle timeslot includes determining a synchronization moment of the third blank subframe and the fourth blank subframe, and using the synchronization moment of the third blank subframe and the fourth blank subframe as the synchronization moment of the first idle timeslot and the second idle timeslot.

Optionally, before the controlling the working antenna to process a service signal of the current service using the radio frequency channel of the current service antenna, the method further includes, if the working antenna is not the current service antenna, controlling the current service antenna to be disconnected from the radio frequency channel of the current service antenna, and controlling the working antenna to be switched to the radio frequency channel of the current service antenna.

Optionally, before the controlling the working antenna to be switched to the radio frequency channel of the current service antenna, the method further includes determining whether the working antenna meets a switching condition; and if the working antenna meets the switching condition, performing the step of controlling the working antenna to be switched to the radio frequency channel of the current service antenna.

Optionally, after the selecting a working antenna according to the signal strength information of the current service antenna and the signal strength information of the another service antenna, the method further includes regularly polling the signal strength information of the current service antenna and the signal strength information of the another service antenna; and updating, according to the signal strength information of the current service antenna and the signal strength information of the another service antenna that are obtained by means of polling, the working antenna that processes the service signal of the current service.

According to the method provided in this embodiment of the present disclosure, a working antenna is determined according to signal strength information of a current service antenna and signal strength information of another service antenna; the working antenna determined according to the signal strength information of the current service antenna and the signal strength information of the another service antenna may be the current service antenna or may be the another service antenna, and when multiple working antennas are determined, the working antennas may process a same service or may process different services. Therefore, not only a manner in which the working antenna processes a service signal of a current service is more flexible, but also it is ensured that a service antenna with good signal strength can be used as a working antenna, thereby increasing a service processing rate.

Figure 4:
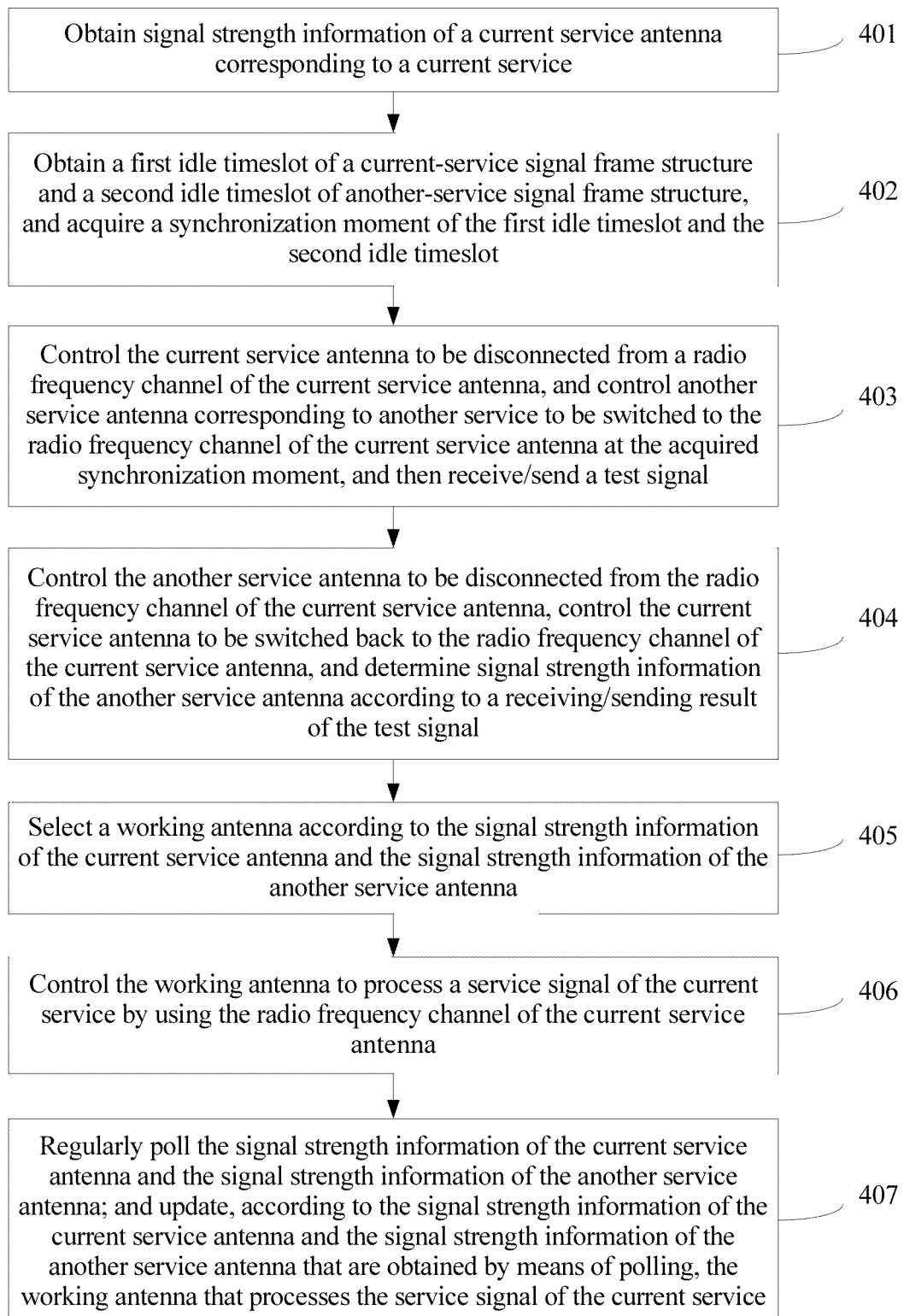
FIG. 4 is a flowchart of a service signal processing method according to another embodiment of the present disclosure.

FIG. 4 shows a flowchart of a service signal processing method according to an example embodiment. With reference to content of the foregoing embodiment, a method procedure provided in this embodiment of the present disclosure includes the following steps.

401. Obtain signal strength information of a current service antenna corresponding to a current service.

For a manner of obtaining the signal strength information of the current service antenna, the current service antenna may be controlled to receive/send a service signal of the current service, and obtain the signal strength information of the current service antenna in CPE according to strength of the service signal, of the current service, received/sent by the current service antenna.

For specific content of the signal strength information, the signal strength information includes but is not limited to a receive level of an antenna or a signal-to-noise ratio of an antenna. The current service may be a hotspot service or may be a mobile network service. When the current service is a mobile network service, the current service includes but is not limited to an LTE service, a CDMA service, or a GSM service.

It should be noted that if the CPE includes multiple current service antennas, signal strength information of each current service antenna first needs to be obtained, so as to subsequently select a service antenna with good signal strength from service antennas of services as a working antenna. At the time of obtaining the signal strength information of each current service antenna, if each current service antenna currently is processing a service signal of the current service, the signal strength information of all the current service antennas may be obtained at the same time. If currently only a part of the current service antennas are processing a service signal of the current service, only signal strength information of the part of the current service antennas may be obtained, and when another current service antenna is processing a service signal of the current service, signal strength information of the another current service antenna is then determined.

For example, if the current service is a WiFi service, and the CPE includes two WiFi antennas, if currently both the two WiFi antennas are processing a service signal of the WiFi service, in this case, signal strength information of the two WiFi antennas may be obtained at the same time. If in this case, only WiFi antenna 1 is processing a service signal of the WiFi service, only signal strength information of WiFi antenna 1 may be obtained; when WiFi antenna 2 participates in processing of a service signal of the WiFi service, signal strength information of WiFi antenna 2 is further determined.

Further, after the signal strength information of the current service antenna is obtained, signal strength information of another service antenna in the CPE further needs to be obtained. Obtaining the signal strength information of the another service antenna may be implemented with the help of the current service. A switch or a combiner is disposed between each service antenna and a radio frequency channel of the service antenna in this embodiment of the present disclosure. Therefore, the another service antenna may be switched to a radio frequency channel of the current service antenna, so as to obtain the signal strength information of the another service antenna. For details of a manner of obtaining the signal strength information of the another service antenna, refer to the following step 402 to step 404; details are not described herein.

Similarly, another service is not limited in this embodiment of the present disclosure. For ease of description, in this embodiment of the present disclosure and the subsequent embodiments, that CPE includes a WiFi service and an LTE service is used as an example for description. Therefore, when a current service is the WiFi service, another service is the LTE service; when the current service is the LTE service, the another service is the WiFi service.

402. Obtain a first idle timeslot of a current-service signal frame structure and a second idle timeslot of another-service signal frame structure, and obtain a synchronization moment of the first idle timeslot and the second idle timeslot.

A synchronization moment of an idle timeslot of the current-service signal frame structure and an idle timeslot of the another-service signal frame structure is selected to perform switching, so as to implement that when another service antenna is switched to a radio frequency channel of the current service antenna to obtain signal strength information of the another service antenna, processing a service signal of the current service by the current service antenna is not affected; and to ensure that processing a service signal of another service by the another service antenna is not affected. Therefore, it is required to separately obtain the first idle timeslot of the current-service signal frame structure and the second idle timeslot of the another-service signal frame structure. However, to ensure that the current service antenna is exactly in the second idle timeslot of the another-service signal frame structure when being in the first idle timeslot of the current-service signal frame structure, it is required to determine the synchronization moment of the first idle timeslot and the second idle timeslot, so that the another service antenna can be controlled to be switched to the radio frequency channel of the current service antenna at the obtained synchronization moment.

When the current-service signal frame structure is different, and the another-service signal frame structure is different, content of the first idle timeslot is different, content of the second idle timeslot is different, and a manner of obtaining the synchronization moment of the first idle timeslot and the second idle timeslot is also different. A manner of obtaining a first idle timeslot of a current-service signal frame structure and a second idle timeslot of another-service signal frame structure, and obtaining a synchronization moment of the first idle timeslot and the second idle timeslot includes but is not limited to the following several cases.

Case 1: If the current-service signal frame structure has a receive-send interval, and the another-service signal frame structure has a receive-send interval, at the time of obtaining a first idle timeslot of a current-service signal frame structure and a second idle timeslot of another-service signal frame structure, a first receive-send interval of the current-service signal frame structure may be determined, and the first receive-send interval is used as the first idle timeslot of the current-service signal frame structure; a second receive-send interval of the another-service signal frame structure is determined, and the second receive-send interval is used as the second idle timeslot of the another-service signal frame structure; and at the time of obtaining a synchronization moment of the first idle timeslot and the second idle timeslot, a synchronization moment of the first receive-send interval and the second receive-send interval may be obtained, and the synchronization moment of the first receive-send interval and the second receive-send interval is used as the synchronization moment of the first idle timeslot and the second idle timeslot.

Figure 5A:
FIG. 5A and FIG. 5B are a schematic diagram of a signal frame structure according to another embodiment of the present disclosure.
Figure 5B:
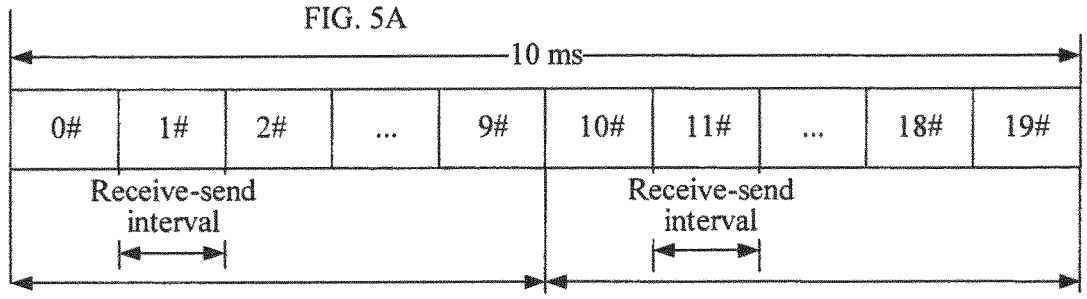

For example, the current service and the another service are respectively a WiFi service and an LTE service; FIG. 5A and FIG. 5B show a schematic diagram of a signal frame structure. FIG. 5A shows a schematic diagram of a WiFi signal frame structure. In FIG. 5A, a timeslot in a shaded part indicates a timeslot for receiving/sending a WiFi signal, and a blank timeslot indicates a receive-send interval in the WiFi signal frame structure. It may be seen from FIG. 5A that the WiFi signal frame structure has a receive-send interval. For the LTE service, there may be a time division duplex (TDD)-LTE signal frame structure and a frequency division duplex (FDD)-LTE signal frame structure. FIG. 5B shows a schematic diagram of a TDD-LTE signal frame structure. A frame length of each TDD-LTE signal frame structure is 10 milliseconds (ms), consisting of 20 timeslots; each half-frame has a length of 5 ms. Each half-frame includes one special timeslot, where the special timeslot may be used as a receive-send interval, such as 1# timeslot in FIG. 5B. Therefore, the TDD-LTE signal frame structure also has a receive-send interval. In this case, a first receive-send interval of the WiFi signal frame structure may be determined, and the first receive-send interval is used as the first idle timeslot; a second receive-send interval of the TDD-LTE signal frame structure is determined, and the second receive-send interval is used as the second idle timeslot; a synchronization moment of the first receive-send interval and the second receive-send interval is obtained, so that subsequently a TDD-LTE antenna can be controlled to be switched to a radio frequency channel of a WiFi antenna at the synchronization moment of the second receive-send interval and the first receive-send interval. At the time of obtaining the synchronization moment of the first receive-send interval and the second receive-send interval, searching for the synchronization moment with the second receive-send interval may start at a starting point of the first receive-send interval. For example, if duration of the first receive-send interval is from 9:23:20.25 to 9:23:20.30, searching for the synchronization moment with the second receive-send interval starts at 9:23:20.25; if the TDD-LTE signal frame structure is exactly in the second receive-send interval when searching is performed at 9:23:20.28, 9:23:20.28 is used as the synchronization moment of the first receive-send interval and the second receive-send interval.

Case 2: If the current-service signal frame structure has a receive-send interval, but the another-service signal frame structure does not have a receive-send interval, at the time of obtaining a first idle timeslot of a current-service signal frame structure and a second idle timeslot of another-service signal frame structure, a third receive-send interval of the current-service signal frame structure may be determined, and the third receive-send interval is used as the first idle timeslot of the current-service signal frame structure; a first blank subframe in the another-service signal frame structure is determined, and the first blank subframe is used as the second idle timeslot of the another-service signal frame structure; and at the time of obtaining a synchronization moment of the first idle timeslot and the second idle timeslot, it includes but is not limited to searching the first blank subframe for a synchronization moment with the third receive-send interval, and using the found synchronization moment as the synchronization moment of the first idle timeslot and the second idle timeslot.

Figure 6A:
FIG. 6A and FIG. 6B are a schematic diagram of a signal frame structure according to another embodiment of the present disclosure.
Figure 6B:
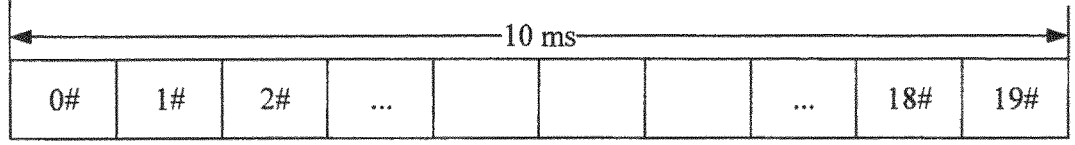

For example, the current service and the another service are respectively a WiFi service and an LTE service; FIG. 6A and FIG. 6B show a schematic diagram of a signal frame structure. FIG. 6A shows a schematic diagram of a WiFi signal frame structure. In FIG. 6A, a timeslot in a shaded part indicates a timeslot for receiving/sending a WiFi signal, and a blank timeslot indicates a receive-send interval in the WiFi frame structure. FIG. 6B shows a schematic diagram of an FDD-LTE signal frame structure. A frame length of each FDD-LTE signal frame structure is 10 ms, consisting of 20 subframes, where 10 subframes may be used for uplink transmission, and 10 subframes may be used for downlink transmission. It may be seen from FIG. 6B that the FDD-LTE signal frame structure does not have a receive-send interval. However, for the FDD-LTE signal frame structure, there is an extremely low possibility that 10 subframes thereof are scheduled at a same moment. Therefore, a blank subframe that has no data service and control information may be used, and the blank subframe in the FDD-LTE signal frame structure is searched for a synchronization moment with the receive-send interval of the WiFi signal frame structure, so that the synchronization moment is used as the synchronization moment of the first idle timeslot and the second idle timeslot. At the time of searching the blank subframe of the FDD-LTE signal frame structure for the synchronization moment with the receive-send interval of the WiFi signal frame structure, searching may also start at a starting moment of the blank subframe, until searching is performed at a moment at which the WiFi service signal frame structure is exactly in its receive-send interval when the FDD-LTE signal frame structure is in the blank subframe, so that the moment is used as the obtained synchronization moment.

Case 3: If the current-service signal frame structure does not have a receive-send interval, but the another-service signal frame structure has a receive-send interval, at the time of obtaining a first idle timeslot of a current-service signal frame structure and a second idle timeslot of another-service signal frame structure, a second blank subframe in the current-service signal frame structure may be determined, and the second blank subframe is used as the first idle timeslot of the current-service signal frame structure; a fourth receive-send interval of the another-service signal frame structure is determined, and the fourth receive-send interval is used as the second idle timeslot of the another-service signal frame structure; and at the time of obtaining a synchronization moment of the first idle timeslot and the second idle timeslot, it includes but is not limited to searching the second blank subframe for a synchronization moment with the fourth receive-send interval, and using the found synchronization moment as the synchronization moment of the first idle timeslot and the second idle timeslot.

For example, when the current service is an FDD-LTE service, and the another service is a WiFi service, because an FDD-LTE signal frame structure does not have a receive-send interval, a blank subframe of the FDD-LTE signal frame structure may be determined with reference to FIG. 6, and the blank subframe of the FDD-LTE signal frame structure is searched for a synchronization moment with a receive-send interval of a WiFi signal frame structure. A principle of searching the blank subframe of the FDD-LTE signal frame structure for a synchronization moment with the receive-send interval of the WiFi signal frame structure is consistent with a principle of searching the blank subframe of the FDD-LTE signal frame structure for the synchronization moment with the receive-send interval of the WiFi signal frame structure in the foregoing case 2; for details, refer to content in the foregoing case 2; details are not described herein again.

Case 4: If the current-service signal frame structure does not have a receive-send interval, and the another-service signal frame structure does not have a receive-send interval, at the time of obtaining a first idle timeslot of a current-service signal frame structure and a second idle timeslot of another-service signal frame structure, a third blank subframe in the current-service signal frame structure may be determined, and the third blank subframe is used as the first idle timeslot of the current-service signal frame structure; a fourth blank subframe in the another-service signal frame structure is determined, and the fourth blank subframe is used as the second idle timeslot of the another-service signal frame structure; and at the time of obtaining a synchronization moment of the first idle timeslot and the second idle timeslot, it includes but is not limited to determining a synchronization moment of the third blank subframe and the fourth blank subframe, and using the synchronization moment of the third blank subframe and the fourth blank subframe as the synchronization moment of the first idle timeslot and the second idle timeslot.

For this case, neither of the current-service signal frame structure and the another-service signal frame structure has a receive-send interval; however, during service processing, neither of a subframe in the current-service signal frame structure and a subframe in the another-service signal frame structure may be used for transmitting any service data or control signal at a moment. Therefore, the current-service signal frame structure and the another-service signal frame structure may be respectively searched for the third blank subframe and the fourth blank subframe, the synchronization moment of the third blank subframe and the fourth blank subframe is obtained, and the synchronization moment is used as the obtained synchronization moment. At the time of obtaining the synchronization moment of the third blank subframe and the fourth blank subframe, searching for the synchronization moment with the fourth blank subframe may start at a starting moment of the third blank subframe, or searching for the synchronization moment with the third blank subframe may start at a starting moment of the fourth blank subframe.

It should be noted that if both a quantity of current service antennas and a quantity of another service antennas in CPE are at least two, at the time of obtaining a first idle timeslot of a current-service signal frame structure and a second idle timeslot of another-service signal frame structure, to determine signal strength information of each current service antenna and each another service antenna, each first idle timeslot corresponding to a current-service signal frame structure of each current service antenna and each second idle timeslot corresponding to another-service signal frame structure of each another service antenna need to be obtained. At the time of obtaining a synchronization moment of the first idle timeslot and the second idle timeslot, a synchronization moment of each first idle timeslot and a second idle timeslot corresponding to the first idle timeslot needs to be obtained.

For ease of explaining the foregoing content, a specific example is used for description in the following.

For example, with reference to FIG. 1, the CPE includes two WiFi antennas and two LTE antennas, a current service is a WiFi service, and another service is an LTE service. LTE antenna 1 corresponds to WiFi antenna 1, and LTE antenna 2 corresponds to WiFi antenna 2. In addition, in this case, both WiFi antenna 1 and WiFi antenna 2 participate in processing of a service signal of the current service. Usually, LTE antenna 1 can be switched to only a radio frequency channel of WiFi antenna 1, and LTE antenna 2 can be switched to only a radio frequency channel of WiFi antenna 2. In this case, at the time of obtaining a first idle timeslot of a WiFi signal frame structure and a second idle timeslot of an LTE signal frame structure, it is required to respectively determine first idle timeslot 1 and first idle timeslot 2 of signal frame structures of WiFi antenna 1 and WiFi antenna 2, and second idle timeslot 1 and second idle timeslot 2 of signal frame structures of LTE antenna 1 and LTE antenna 2. At the time of obtaining a synchronization moment of the first idle timeslot and the second idle timeslot, it is required to obtain a synchronization moment of first idle timeslot 1 and second idle timeslot 1, and a synchronization moment of first idle timeslot 2 and second idle timeslot 2.

403. Control the current service antenna to be disconnected from a radio frequency channel of the current service antenna; and control another service antenna corresponding to another service to be switched to the radio frequency channel of the current service antenna at the obtained synchronization moment, and then receive/send a test signal.

Processing of a service signal of the current service is usually first implemented by the current service antenna using the radio frequency channel of the current service antenna. Therefore, to switch the another service antenna to the radio frequency channel of the current service antenna to obtain signal strength information of the another service antenna, it is required to first control the current service antenna to be disconnected from the radio frequency channel of the current service antenna, then control the another service antenna to be switched to the radio frequency channel of the current service antenna at the obtained synchronization moment, and continue to control the another service antenna to receive/send a test signal using the radio frequency channel of the current service antenna, thereby determining the signal strength information of the another service antenna according to a receiving/sending result of the test signal.

For a specific source of the test signal, the test signal may be a signal that is specially used for testing signal strength information of a service antenna and that is sent by a fixed device, may be a service signal, of the current service, sent by a peer device of CPE, or the like.

For ease of explaining the foregoing process, a specific example is used for description in the following. For example, if CPE includes one WiFi antenna and one LTE antenna, and a current service is a WiFi service, to determine signal strength information of the LTE antenna, the WiFi antenna may be controlled to be disconnected from a radio frequency channel of the WiFi antenna, and the LTE antenna may be controlled to be switched to the radio frequency channel of the WiFi antenna and receive/send a test signal, so as to determine the signal strength information of the LTE antenna according to a receiving/sending result of the test signal.

It should be noted that if both a quantity of current service antennas and a quantity of another service antennas in CPE are at least two, and each current service antenna participates in processing of a service signal of a current service in this case, at the time of controlling the current service antenna to be disconnected from a radio frequency channel of the current service antenna, it is required to control each current service antenna to be disconnected from a radio frequency channel of the current service antenna. At the time of controlling each current service antenna to be disconnected from the radio frequency channel of the current service antenna, all current service antennas may be disconnected from radio frequency channels of all the current service antennas at the same time, or all current service antennas may be disconnected from radio frequency channels of all the current service antennas successively in order, which is not limited in this embodiment of the present disclosure. At the time of controlling the another service antenna to be switched to the radio frequency channel of the current service antenna at the obtained synchronization moment, and then receive/send a test signal, it is required to control each another service antenna to be switched to a radio frequency channel of a current service antenna corresponding to the another service antenna at the obtained synchronization moment, and control each another service antenna to receive/send a test signal. In addition, at the time of controlling each another service antenna to be switched to the radio frequency channel of the current service antenna corresponding to the another service antenna at the obtained synchronization moment, if all the current service antennas are disconnected from the radio frequency channels of all the current service antennas at the same time, all another service antennas are switched to radio frequency channels of current service antennas corresponding to all the another service antennas at the same time; and if all the current service antennas are successively disconnected from the radio frequency channels of all the current service antennas, each another service antenna is switched to the radio frequency channel of the current service antenna corresponding to the another service antenna at a moment when each current service antenna is disconnected from a radio frequency channel of the current service antenna.

For example, CPE includes at least two WiFi antennas and at least two LTE antennas, a current service is a WiFi service, another service is an LTE service, and the schematic structural diagram of antennas in the CPE shown in FIG. 1 is used as an example. In FIG. 1, LTE antenna 1 corresponds to WiFi antenna 1, and LTE antenna 2 corresponds to WiFi antenna 2. Therefore, it is required to first control WiFi antenna 1 and WiFi antenna 2 to be disconnected respectively from a radio frequency channel of WiFi antenna 1 and a radio frequency channel of WiFi antenna 2, and control LTE antenna 1 and LTE antenna 2 to be switched respectively to the radio frequency channel of WiFi antenna 1 and the radio frequency channel of WiFi antenna 2 at an obtained synchronization moment. In this case, LTE antenna 1 and LTE antenna 2 are controlled to receive/send a test signal by respectively using the radio frequency channel of WiFi antenna 1 and the radio frequency channel of WiFi antenna 2, so that signal strength information of LTE antenna 1 and signal strength information of LTE antenna 2 can be determined subsequently according to receiving/sending results of the test signals of LTE antenna 1 and LTE antenna 2.

404. Control the another service antenna to be disconnected from the radio frequency channel of the current service antenna, control the current service antenna to be switched back to the radio frequency channel of the current service antenna, and determine signal strength information of the another service antenna according to a receiving/sending result of the test signal.

After the another service antenna is controlled to be switched to the radio frequency channel of the current service antenna at the obtained synchronization moment so as to complete determining the signal strength information of the another service antenna, to ensure that processing a service signal of the current service using the current service antenna is not affected, it is further required to control the another service antenna to be disconnected from the radio frequency channel of the current service antenna, and control the current service antenna to be switched back to the radio frequency channel of the current service antenna, so as to determine the signal strength information of the another service antenna according to the receiving/sending result of the test signal. To ensure that processing a service signal of the current service by the current service antenna is not affected, it is required to ensure that the step of controlling the current service antenna to be switched back to the radio frequency channel of the current service antenna is completed in the first idle timeslot determined in step 402.

A manner of controlling the another service antenna to be disconnected from the radio frequency channel of the current service antenna and a manner of controlling the current service antenna to be switched back to the radio frequency channel of the current service antenna may be controlling a switch between the another service antenna and the radio frequency channel of the current service antenna to be off, and controlling a switch of the current service antenna to be connected to the radio frequency channel of the current service.

For a manner of determining the signal strength information of the another service antenna according to the receiving/sending result of the test signal, to select a working antenna according to the signal strength information of the current service antenna and the signal strength information of the another service antenna, content of the determined signal strength information of the another service antenna needs to be consistent with content of the signal strength information, of the current service antenna, determined in step 401. For example, if the signal strength information, of the current service antenna, determined in step 401 is a receive-send level, the signal strength information, of the another service antenna, determined in this step also is a receive-send level.

Further, if both a quantity of current service antennas and a quantity of another service antennas are at least two, the at least two another service antennas are switched to radio frequency channels of the current service antennas at the time of obtaining signal strength information of the another service antennas. In this case, at the time of controlling the another service antenna to be disconnected from the radio frequency channel of the current service antenna, and controlling the current service antenna to be switched back to the radio frequency channel of the current service antenna, it is required to control each another service antenna to be disconnected from a radio frequency channel of a current service antenna corresponding to the another service antenna, and control each current service antenna to be switched back to a radio frequency channel of the current service antenna.

With reference to the example in the previous step that the CPE includes two WiFi antennas and two LTE antennas, in this case, it is required to control LTE antenna 1 and LTE antenna 2 to be disconnected respectively from the radio frequency channel of WiFi antenna 1 and the radio frequency channel of WiFi antenna 2, and control WiFi antenna 1 and WiFi antenna 2 to be switched back respectively to the radio frequency channel of WiFi antenna 1 and the radio frequency channel of WiFi antenna 2.

It should be noted that in the foregoing steps, only an example that the signal strength information of the current service antenna is first obtained, and the signal strength information of the another service antenna is then obtained is used to explain the method provided in this embodiment of the present disclosure. However, during specific implementation, alternatively, the signal strength information of the another service antenna may be first obtained, and the signal strength information of the current service antenna is then obtained.

405. Select a working antenna according to the signal strength information of the current service antenna and the signal strength information of the another service antenna.

After the signal strength information of the current service antenna and the signal strength information of the another service antenna are determined by performing step 401 to step 404, to ensure that a service antenna with good signal strength can be used as a working antenna to process a service signal of the current service, a working antenna may be selected according to the signal strength information of the current service antenna and the signal strength information of the another service antenna.

A manner of selecting the working antenna according to the signal strength information of the current service antenna and the signal strength information of the another service antenna may be first sorting signal strength information of all service antennas in CPE according to the signal strength information of the current service antenna and the signal strength information of the another service antenna, so as to select a service antenna with good signal strength as a working antenna according to a sorting result.

This embodiment of the present disclosure does not limit a specific quantity of working antennas. During specific implementation, the quantity of working antennas may be determined with reference to a total quantity of service antennas included by each service in CPE and traffic of a current service. For example, if CPE includes one hotspot antenna and one mobile-network antenna, one service antenna may be selected as a working antenna. For another example, if CPE includes at least two hotspot antennas and at least two mobile-network antennas, but traffic of a current service is relatively moderate, two service antennas may be selected, according to signal strength information of the hotspot antennas and signal strength information of the mobile-network antennas, as working antennas to process a service signal of the current service. However, during specific implementation, three or four antennas may also be selected, according to signal strength information of hotspot antennas and signal strength information of mobile-network antennas, as working antennas to process a service signal of a current service.

406. Control the working antenna to process a service signal of the current service using the radio frequency channel of the current service antenna.

Processing of the service signal of the current service needs to be implemented using the radio frequency channel of the current service. Therefore, it is required to control the working antenna to process the service signal of the current service using the radio frequency channel of the current service antenna.

If CPE includes one hotspot antenna and one mobile-network antenna, and a current service is a hotspot service, if a determined working antenna is the hotspot antenna, the hotspot antenna is controlled to process a service signal of the hotspot service using a radio frequency channel of the hotspot antenna; or if a determined working antenna is the mobile-network antenna, the mobile-network antenna is controlled to be switched to a radio frequency channel of the hotspot antenna, and process a service signal of the hotspot service using the radio frequency channel of the hotspot antenna.

In addition, if CPE includes at least two hotspot antennas and at least two mobile-network antennas, a current service is a hotspot service, and two working antennas are determined, if the working antennas are two hotspot antennas, a service signal of the hotspot service may be processed using radio frequency channels of the two hotspot antennas; if the working antennas are one hotspot antenna and one mobile-network antenna, the hotspot antenna is controlled to process a service signal of the hotspot service using a radio frequency channel corresponding to the hotspot antenna, and the mobile-network antenna is controlled to be switched to a radio frequency channel of a hotspot antenna corresponding to the mobile-network antenna so as to process a service signal of the hotspot service; or if the working antennas are two mobile-network antennas, the two mobile-network antennas may be respectively switched to radio frequency channels of corresponding hotspot antennas, and process a service signal of the hotspot service using the radio frequency channels of the hotspot service antennas.

It should be noted that because a working antenna is determined according to signal strength information of all service antennas in CPE in this embodiment of the present disclosure, a case in which determined working antennas do not belong to a same service or all determined working antennas are not current service antennas may occur. Therefore, before the controlling the working antenna to process a service signal of the current service using the radio frequency channel of the current service antenna, if it is determined that a working antenna is not a current service antenna, it is required to first control a current service antenna corresponding to the working antenna to be disconnected from a radio frequency channel of the current service antenna, and control the working antenna to be switched to the radio frequency channel of the current service antenna.

For example, a current service is a WiFi service, two working antennas are determined according to signal strength information of all service antennas, and the two determined working antennas are one WiFi antenna and one LTE antenna. Because the LTE antenna essentially does not belong to a WiFi service antenna, it is required to switch the LTE antenna to a radio frequency channel of a WiFi antenna. For example, with reference to FIG. 1, if the LTE antenna corresponds to WiFi antenna 1, the LTE antenna is switched to a radio frequency channel of WiFi antenna 1.

Determining whether a working antenna is a current service antenna needs to be implemented by first determining a current service and then comparing all working antennas with the current service. If the current service and the another service involved in this embodiment of the present disclosure are a WiFi service and an LTE service, at the time of determining whether the current service is the WiFi service or the LTE service, whether there is no user accessing a WiFi interface of CPE, whether a user connects to a CPE product using a network cable, and whether a data channel is from LTE to a local area network (LAN) may be detected. If there is no user accessing the WiFi interface of the CPE, the user connects to the CPE product using the network cable, and the data channel is from LTE to the LAN, it is determined that the current service is the LTE service. In addition, whether there is a data service requirement in LTE and that the CPE connects to the LAN using which data channel may be detected; if there is no data service requirement in LTE or a customer data channel connects to the LAN using the WiFi interface, it is determined that the current service is the WiFi service or the LTE service otherwise.

Optionally, after the another service antenna is selected as a working antenna, to ensure that processing a service signal of the another service by the another service antenna is not affected when the working antenna is switched to the radio frequency channel of the current service antenna, before the working antenna is switched to the radio frequency channel of the current service antenna, it is further required to determine whether the working antenna meets a switching condition; and if the working antenna meets the switching condition, the working antenna is switched to the radio frequency channel of the current service antenna.

The switching condition includes but is not limited to whether a service of the another service antenna is idle or traffic of the another service is less than a preset threshold. A specific value of the preset threshold may be set as required.

With reference to the specific content of the foregoing switching condition, determining whether the working antenna meets the switching condition includes but is not limited to being implemented by determining whether a service corresponding to the working antenna is idle or traffic of a service corresponding to the working antenna is less than the preset threshold.

In addition, in the working antennas determined in this embodiment of the present disclosure, if at least two working antennas are determined as required, a case in which at least one working antenna in the at least two determined working antennas is not a current service antenna may occur. That is, according to the method provided in this embodiment of the present disclosure, a service signal of a current service may be processed by means of multiplexing of another service antenna in CPE. In this case, when working antennas are service antennas of different services, antenna multiplexing can be implemented, which not only diversifies working antenna types but also ensures that a service antenna with good signal strength can be selected as a working antenna to process a service signal of the current service, thereby implementing better coverage effects of the service signal.

Figure 7A:
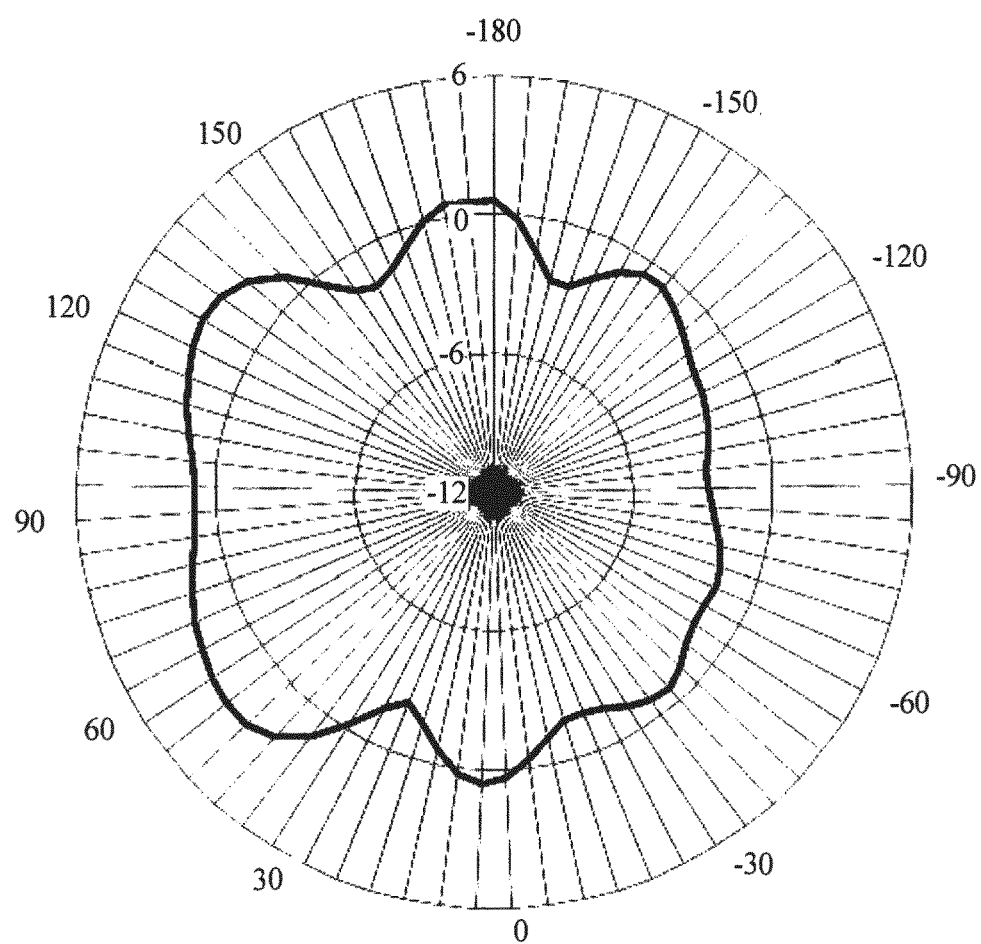
FIG. 7A and FIG. 7B are a schematic diagram of a directivity pattern when a working antenna provided by a related technology is used to process a service signal of a current service according to another embodiment of the present disclosure.
Figure 7B:
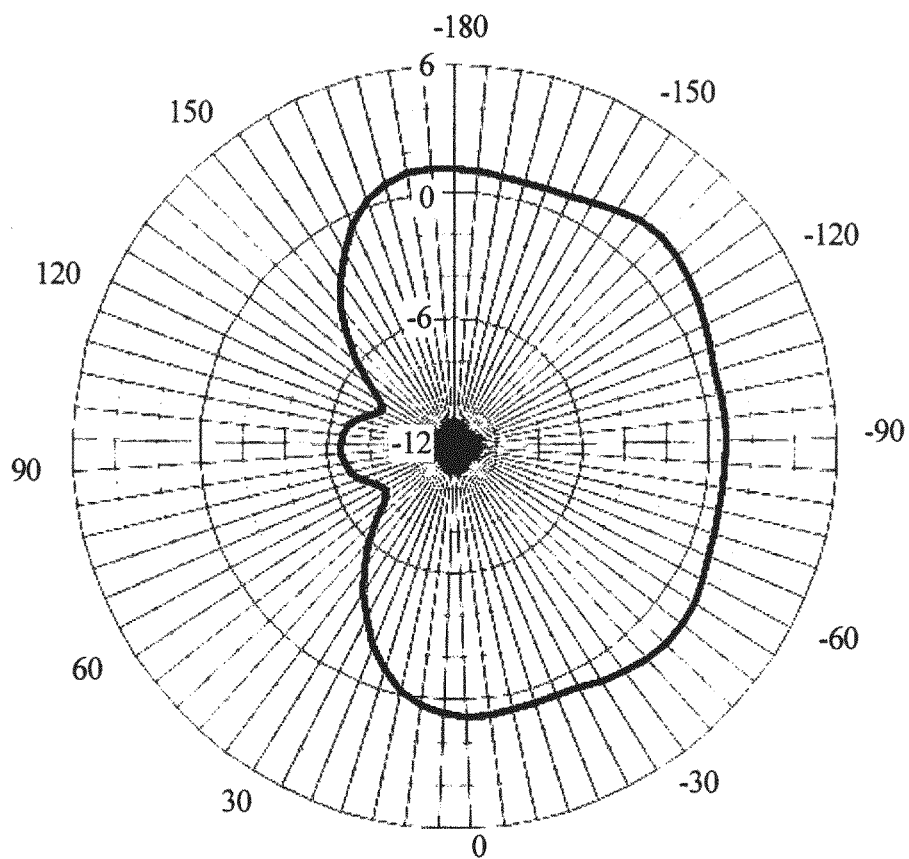

For example, FIG. 7A and FIG. 7B show schematic diagrams of directivity patterns when working antennas provided by a related technology are used to process a service signal of a current service. The working antennas are two WiFi antennas. An irregular curve in FIG. 7A shows a directivity pattern, in a horizontal direction, combined by the two WiFi antennas; an irregular curve in FIG. 7B shows a directivity pattern, in a vertical direction, combined by the two WiFi antennas. It may be seen from FIG. 7A and FIG. 7B that the two WiFi antennas can meet omnidirectional coverage in a horizontal plane, but there is relatively poor coverage in a vertical plane in which a large coverage hole exists.

Figure 8A:
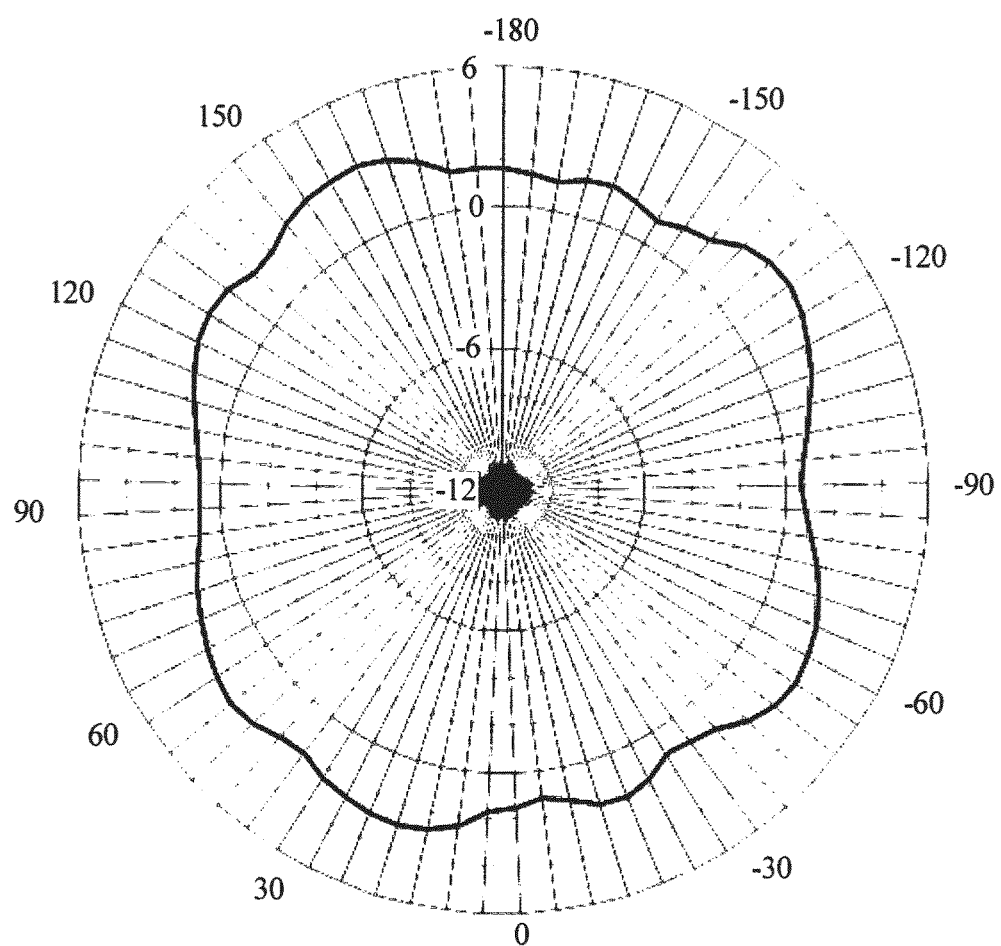
FIG. 8A and FIG. 8B are a schematic diagram of a directivity pattern when a working antenna provided by an embodiment of the present disclosure is used to process a service signal of a current service according to another embodiment of the present disclosure.
Figure 8B:
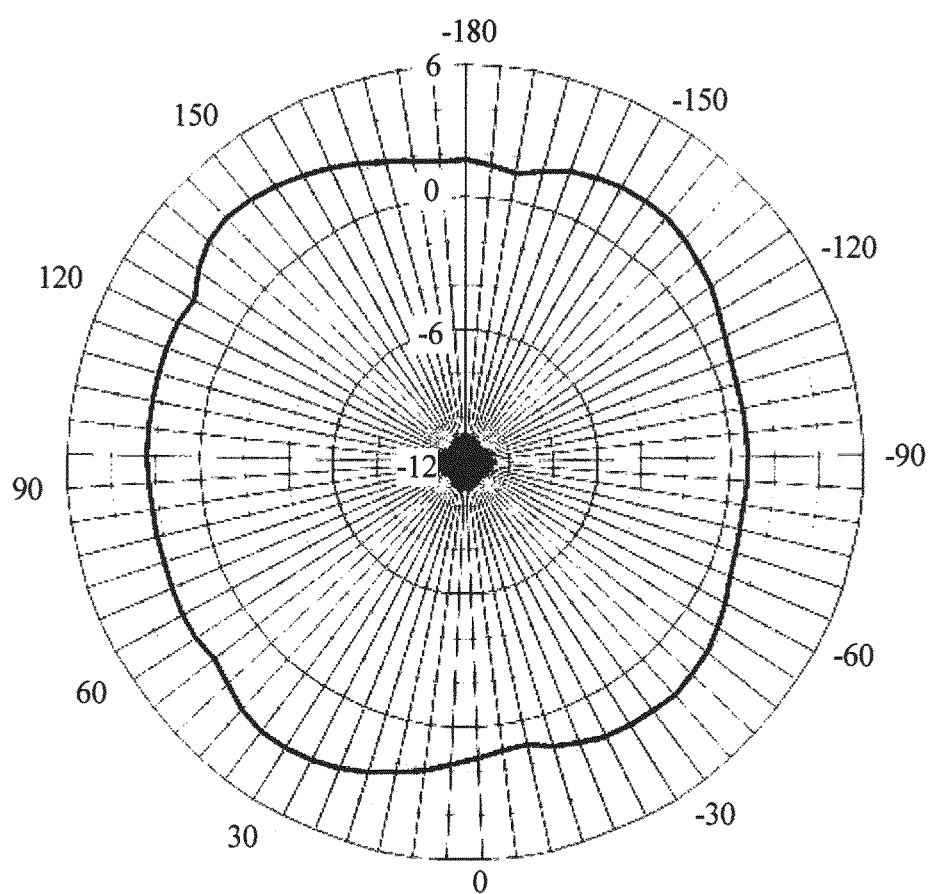

After working antennas are determined using the method provided in this embodiment of the present disclosure, schematic diagrams of a directivity pattern in a horizontal direction and a directivity pattern in a vertical direction when the working antennas process a service signal of a current service are respectively indicated by an irregular curve in FIG. 8A and an irregular curve in FIG. 8B. It may be seen from FIG. 8A and FIG. 8B that when working antennas determined using the method provided in this embodiment of the present disclosure process a service signal of a current service, not only a coverage condition in a vertical plane is greatly improved, but also a coverage condition in a horizontal plane is further improved. In addition, it may be learned, by respectively comparing FIG. 8A and FIG. 8B with FIG. 7A and FIG. 7B, that when the working antennas provided in this embodiment of the present disclosure process a service signal of the current service, gain values of the antennas also increase to some extent.

It should be noted that because bandwidth scopes of service antennas of different services are inconsistent, when determined working antennas are service antennas of different services, it is required to ensure that the service antennas of the different services have bandwidths of overlapped scopes, so as to ensure that processing of a service signal can be implemented by means of antenna multiplexing.

For example, a mobile-network antenna usually has a relatively wide bandwidth, and an operating frequency band of the mobile-network antenna may cover 698 MegaHertz (MHz) to 960 MHz and 1710 MHz to 2690 MHz; an operating frequency band of a hotspot antenna usually is 2.4 GigaHertz (GHz) to 2.5 GHz and is included within a working bandwidth of the mobile-network antenna. Therefore, if a current service is a hotspot service, and at least one antenna in determined working antennas is a mobile-network antenna, during idle duration of a mobile network service or when traffic of a mobile network service is not greater than a preset threshold, the mobile-network antenna may be switched to a radio frequency channel of a hotspot antenna using a switch or a combiner, thereby implementing that a capability of receiving/sending a signal by the hotspot antenna is improved by means of antenna multiplexing.

In addition, a hotspot antenna has a relatively narrow bandwidth that usually covers only 2.4 GHz to 2.5 GHz. Therefore, when a current service is a mobile network service, if working antennas include at least one hotspot antenna, the hotspot antenna may be designed to be a wideband antenna or the hotspot antenna is implemented as a wideband antenna by cooperating with a switch adjustable technology, so as to implement that the hotspot antenna can process the mobile network service, thereby implementing that the hotspot antenna is used as multiplexing of a mobile-network antenna. For example, if an original operating frequency band of the hotspot antenna is 2.4 GHz to 2.5 GHz, the operating frequency band of the hotspot antenna may be switched to 2.3 GHz to 2.4 GHz or 2.5 GHz to 2.69 GHz using the switch adjustable technology, and therefore, the hotspot antenna is used as multiplexing of a mobile-network antenna with a B40, B38, B7, or B41 frequency band. A hotspot service may be a WiFi service, and the mobile network service includes but is not limited to an LTE service. In addition, if the hotspot antenna is designed to be a wideband antenna with a same bandwidth as that of the mobile-network antenna, another frequency band of the hotspot antenna may also be used as multiplexing of the mobile-network antenna.

407. Regularly poll the signal strength information of the current service antenna and the signal strength information of the another service antenna; and update, according to the signal strength information of the current service antenna and the signal strength information of the another service antenna that are obtained by means of polling, the working antenna that processes the service signal of the current service.

This step is an optional step. Because signal strength information of each service antenna in CPE may continuously change with factors such as time or a location of the CPE, the signal strength information of each service antenna in the CPE needs to be detected in real time. In this case, at the time of detecting the signal strength information of each service antenna in the CPE in real time, signal strength information of a current service antenna and signal strength information of another service antenna may be regularly polled, and a working antenna that processes a service signal of a current service is updated according to the signal strength information of the current service antenna and the signal strength information of the another service antenna that are obtained by means of polling.

A specific value of a time interval at which the signal strength information of the current service antenna and the signal strength information of the another service antenna are regularly polled may be set as required. A principle of updating, according to the signal strength information of the current service antenna and the signal strength information of the another service antenna that are obtained by means of polling, the working apparatus that processes the service signal of the current service is consistent with a principle of controlling the working antenna to process the service signal of the current service using the radio frequency channel of the current service antenna; for details, refer to content in the foregoing step 406; details are not described herein again.

It should be noted that the foregoing content explains, by only using an example that CPE includes service antennas processing different services, the service signal processing method provided in this embodiment of the present disclosure. However, if service antennas in same CPE are a same type of service antennas that process signals on different frequency bands, during service signal processing, a service signal of a current service may also be processed, according to the method provided in this embodiment of the present disclosure, by means of antenna multiplexing between the service antennas that process the signals on the different frequency bands. Alternatively, after signal strength information of each service antenna in CPE is determined, at least two working antennas that process a service signal of a current service may be selected according to the signal strength information of each service antenna.

For example, if CPE includes two 2.4 GHz WiFi antennas and two 5 GHz WiFi antennas, the two 2.4 GHz WiFi antennas and the two 5 GHz WiFi antennas may be multiplexed to process a service signal of a current service.

It should be further noted that in addition to CPE, a method for determining a working antenna provided in this embodiment of the present disclosure may be applied to another terminal device, such as a mobile phone, a tablet computer, and a wireless router, which is not limited in this embodiment of the present disclosure.

According to the method provided in this embodiment of the present disclosure, a working antenna is determined according to signal strength information of a current service antenna and signal strength information of another service antenna; the working antenna determined according to the signal strength information of the current service antenna and the signal strength information of the another service antenna may be the current service antenna or may be the another service antenna, and when multiple working antennas are determined, the working antennas may process a same service or may process different services. Therefore, not only a manner in which the working antenna processes a service signal of a current service is more flexible, but also it is ensured that a service antenna with good signal strength can be used as a working antenna, thereby increasing a service processing rate.

Figure 9:
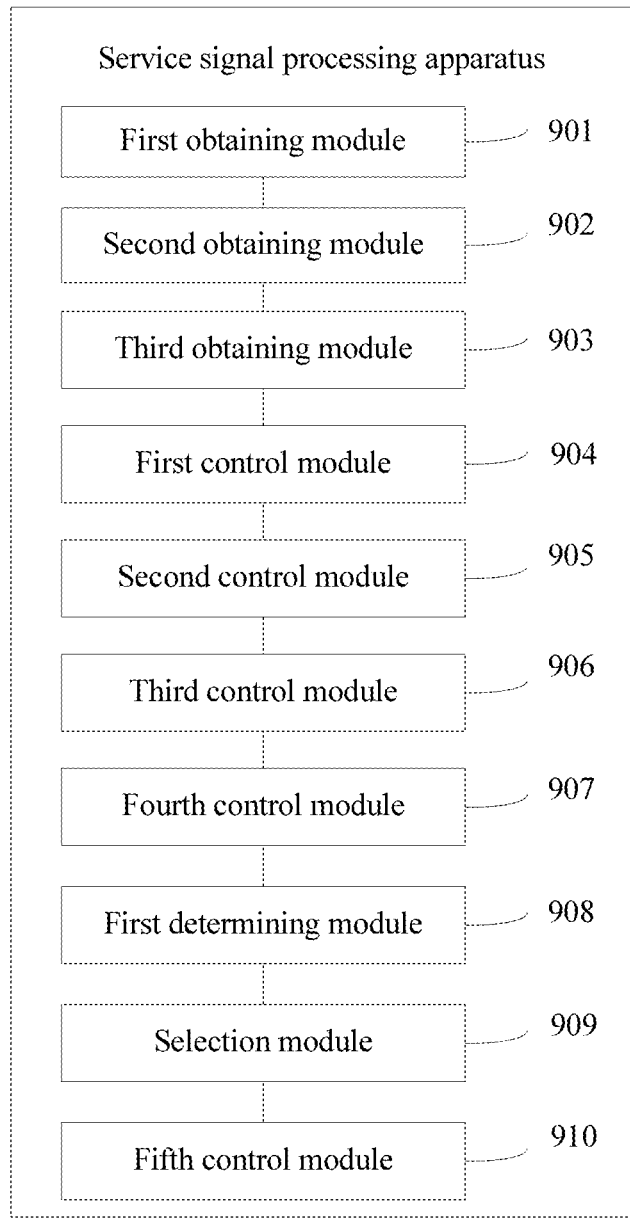
FIG. 9 is a schematic structural diagram of a service signal processing apparatus according to another embodiment of the present disclosure.

FIG. 9 shows a schematic structural diagram of a service signal processing apparatus according to an example embodiment. The apparatus is applied to CPE, and the apparatus may be configured to perform the service signal processing method provided in the embodiment shown in the foregoing FIG. 3 or FIG. 4. Referring to FIG. 9, the apparatus includes a first obtaining module 901 configured to obtain signal strength information of a current service antenna corresponding to a current service; a second obtaining module 902 configured to obtain a first idle timeslot of a current-service signal frame structure and a second idle timeslot of another-service signal frame structure; a third obtaining module 903 configured to obtain a synchronization moment of the first idle timeslot and the second idle timeslot; a first control module 904 configured to control the current service antenna to be disconnected from a radio frequency channel of the current service antenna; a second control module 905 configured to control another service antenna corresponding to another service to be switched to the radio frequency channel of the current service antenna at the obtained synchronization moment, and then receive/send a test signal; a third control module 906 configured to control the another service antenna to be disconnected from the radio frequency channel of the current service antenna; a fourth control module 907 configured to control the current service antenna to be switched back to the radio frequency channel of the current service antenna; a first determining module 908 configured to determine signal strength information of the another service antenna according to a receiving/sending result of the test signal; a selection module 909 configured to select a working antenna according to the signal strength information of the current service antenna and the signal strength information of the another service antenna; and a fifth control module 910 configured to control the working antenna to process a service signal of the current service using the radio frequency channel of the current service antenna.

Optionally, if the current-service signal frame structure has a receive-send interval, and the another-service signal frame structure has a receive-send interval, the second obtaining module 902 includes a first determining unit configured to determine a first receive-send interval of the current-service signal frame structure, and use the first receive-send interval as the first idle timeslot of the current-service signal frame structure; and a second determining unit configured to determine a second receive-send interval of the another-service signal frame structure, and use the second receive-send interval as the second idle timeslot of the another-service signal frame structure; and the third obtaining module 903 includes a first obtaining unit configured to obtain a synchronization moment of the first receive-send interval and the second receive-send interval, and use the synchronization moment of the first receive-send interval and the second receive-send interval as the synchronization moment of the first idle timeslot and the second idle timeslot.

Optionally, if the current-service signal frame structure has a receive-send interval, but the another-service signal frame structure does not have a receive-send interval, the second obtaining module 902 includes a third determining unit configured to determine a third receive-send interval of the current-service signal frame structure, and use the third receive-send interval as the first idle timeslot of the current-service signal frame structure; and a fourth determining unit configured to determine a first blank subframe in the another-service signal frame structure, and use the first blank subframe as the second idle timeslot of the another-service signal frame structure; and the third obtaining module 903 includes a first searching unit configured to search the first blank subframe for a synchronization moment with the third receive-send interval, and use the found synchronization moment as the synchronization moment of the first idle timeslot and the second idle timeslot.

Optionally, if the current-service signal frame structure does not have a receive-send interval, but the another-service signal frame structure has a receive-send interval, the second obtaining module 902 includes a fifth determining unit configured to determine a second blank subframe in the current-service signal frame structure, and use the second blank subframe as the first idle timeslot of the current-service signal frame structure; and a sixth determining unit configured to determine a fourth receive-send interval of the another-service signal frame structure, and use the fourth receive-send interval as the second idle timeslot of the another-service signal frame structure; and the third obtaining module 903 includes a second searching unit configured to search the second blank subframe for a synchronization moment with the fourth receive-send interval, and use the found synchronization moment as the synchronization moment of the first idle timeslot and the second idle timeslot.

Optionally, if the current-service signal frame structure does not have a receive-send interval, and the another-service signal frame structure does not have a receive-send interval, the second obtaining module 902 includes a seventh determining unit configured to determine a third blank subframe in the current-service signal frame structure, and use the third blank subframe as the first idle timeslot of the current-service signal frame structure; and an eighth determining unit configured to determine a fourth blank subframe in the another-service signal frame structure, and use the fourth blank subframe as the second idle timeslot of the another-service signal frame structure; and the third obtaining module 903 includes a ninth determining unit configured to determine a synchronization moment of the third blank subframe and the fourth blank subframe, and use the synchronization moment of the third blank subframe and the fourth blank subframe as the synchronization moment of the first idle timeslot and the second idle timeslot.

Optionally, the apparatus further includes a sixth control module configured to, when the working antenna is not the current service antenna, control the current service antenna to be disconnected from the radio frequency channel of the current service antenna, and control the working antenna to be switched to the radio frequency channel of the current service antenna.

Optionally, the apparatus further includes a second determining module configured to determine whether the working antenna meets a switching condition; and the sixth control module is configured to, when the working antenna meets the switching condition, control the working antenna to be switched to the radio frequency channel of the current service antenna.

Optionally, the apparatus further includes a polling module configured to regularly poll the signal strength information of the current service antenna and the signal strength information of the another service antenna; and an update module configured to update, according to the signal strength information of the current service antenna and the signal strength information of the another service antenna that are obtained by means of polling, the working antenna that processes the service signal of the current service.

According to the apparatus provided in this embodiment of the present disclosure, a working antenna is determined according to signal strength information of a current service antenna and signal strength information of another service antenna; the working antenna determined according to the signal strength information of the current service antenna and the signal strength information of the another service antenna may be the current service antenna or may be the another service antenna, and when multiple working antennas are determined, the working antennas may process a same service or may process different services. Therefore, not only a manner in which the working antenna processes a service signal of a current service is more flexible, but also it is ensured that a service antenna with good signal strength can be used as a working antenna, thereby increasing a service processing rate.

Figure 10:
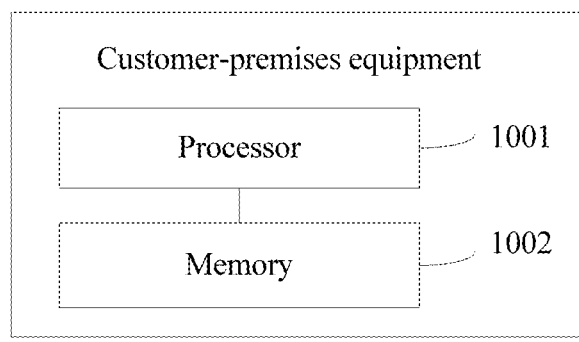
FIG. 10 is a schematic structural diagram of customer-premises equipment according to another embodiment of the present disclosure.

FIG. 10 shows a schematic structural diagram of customer-premises equipment according to an example embodiment. The customer-premises equipment is configured to perform the service signal processing method provided in the embodiment shown in the foregoing FIG. 3 or FIG. 4. Referring to FIG. 10, the customer-premises equipment includes a processor 1001 and a memory 1002 configured to store an executable instruction of the processor 1001.

The processor 1001 is configured to obtain signal strength information of a current service antenna corresponding to a current service; obtain a first idle timeslot of a current-service signal frame structure and a second idle timeslot of another-service signal frame structure; obtain a synchronization moment of the first idle timeslot and the second idle timeslot; control the current service antenna to be disconnected from a radio frequency channel of the current service antenna; control another service antenna corresponding to another service to be switched to the radio frequency channel of the current service antenna at the obtained synchronization moment, and then receive/send a test signal; control the another service antenna to be disconnected from the radio frequency channel of the current service antenna, and control the current service antenna to be switched back to the radio frequency channel of the current service antenna; determine signal strength information of the another service antenna according to a receiving/sending result of the test signal; select a working antenna according to the signal strength information of the current service antenna and the signal strength information of the another service antenna; and control the working antenna to process a service signal of the current service using the radio frequency channel of the current service antenna.

Optionally, if the current-service signal frame structure has a receive-send interval, and the another-service signal frame structure has a receive-send interval, the processor 1001 is further configured to determine a first receive-send interval of the current-service signal frame structure, and use the first receive-send interval as the first idle timeslot of the current-service signal frame structure; determine a second receive-send interval of the another-service signal frame structure, and use the second receive-send interval as the second idle timeslot of the another-service signal frame structure; and obtain a synchronization moment of the first receive-send interval and the second receive-send interval, and use the synchronization moment of the first receive-send interval and the second receive-send interval as the synchronization moment of the first idle timeslot and the second idle timeslot.

Optionally, if the current-service signal frame structure has a receive-send interval, but the another-service signal frame structure does not have a receive-send interval, the processor 1001 is further configured to determine a third receive-send interval of the current-service signal frame structure, and use the third receive-send interval as the first idle timeslot of the current-service signal frame structure; determine a first blank subframe in the another-service signal frame structure, and use the first blank subframe as the second idle timeslot of the another-service signal frame structure; and search the first blank subframe for a synchronization moment with the third receive-send interval, and use the found synchronization moment as the synchronization moment of the first idle timeslot and the second idle timeslot.

Optionally, if the current-service signal frame structure does not have a receive-send interval, but the another-service signal frame structure has a receive-send interval, the processor 1001 is further configured to determine a second blank subframe in the current-service signal frame structure, and use the second blank subframe as the first idle timeslot of the current-service signal frame structure; determine a fourth receive-send interval of the another-service signal frame structure, and use the fourth receive-send interval as the second idle timeslot of the another-service signal frame structure; and search the second blank subframe for a synchronization moment with the fourth receive-send interval, and use the found synchronization moment as the synchronization moment of the first idle timeslot and the second idle timeslot.

Optionally, if the current-service signal frame structure does not have a receive-send interval, and the another-service signal frame structure does not have a receive-send interval, the processor 1001 is further configured to determine a third blank subframe in the current-service signal frame structure, and use the third blank subframe as the first idle timeslot of the current-service signal frame structure; determine a fourth blank subframe in the another-service signal frame structure, and use the fourth blank subframe as the second idle timeslot of the another-service signal frame structure; and determine a synchronization moment of the third blank subframe and the fourth blank subframe, and use the synchronization moment of the third blank subframe and the fourth blank subframe as the synchronization moment of the first idle timeslot and the second idle timeslot.

Optionally, the processor 1001 is further configured to, if the working antenna is not the current service antenna, control the current service antenna to be disconnected from the radio frequency channel of the current service antenna, and control the working antenna to be switched to the radio frequency channel of the current service antenna.

Optionally, the processor 1001 is further configured to determine whether the working antenna meets a switching condition; and if the working antenna meets the switching condition, control the working antenna to be switched to the radio frequency channel of the current service antenna.

Optionally, the processor 1001 is further configured to regularly poll the signal strength information of the current service antenna and the signal strength information of the another service antenna; and update, according to the signal strength information of the current service antenna and the signal strength information of the another service antenna that are obtained by means of polling, the working antenna that processes the service signal of the current service.

According to the customer-premises equipment provided in this embodiment of the present disclosure, a working antenna is determined according to signal strength information of a current service antenna and signal strength information of another service antenna; the working antenna determined according to the signal strength information of the current service antenna and the signal strength information of the another service antenna may be the current service antenna or may be the another service antenna, and when multiple working antennas are determined, the working antennas may process a same service or may process different services. Therefore, not only a manner in which the working antenna processes a service signal of a current service is more flexible, but also it is ensured that a service antenna with good signal strength can be used as a working antenna, thereby increasing a service processing rate.

It should be noted that during service signal processing by the service signal processing apparatus and the customer-premises equipment provided in the foregoing embodiments, description is given only using division of the foregoing function modules. In practical application, the foregoing functions may be allocated to different function modules for implementation as required. That is, an internal structure of the device is divided into different function modules to implement all or a part of the functions described above. In addition, the service signal processing apparatus and the customer-premises equipment provided in the foregoing embodiments pertain to a same concept as the embodiment of the service signal processing method; reference may be made to the method embodiment for a specific implementation process thereof; details are not described herein again.

The sequence numbers of the apparatus modules in the foregoing embodiments of the present disclosure are merely for illustrative purposes, and are not intended to indicate priorities of the embodiments.

A person of ordinary skill in the art may understand that all or some of the steps of the embodiments may be implemented by hardware or a program instructing related hardware. The program may be stored in a computer-readable storage medium. The storage medium may include a read-only memory, a magnetic disk, an optical disc, or the like.

The foregoing descriptions are merely example embodiments of the present disclosure, but are not intended to limit the present disclosure. Any modification, equivalent replacement, and improvement made without departing from the spirit and principle of the present disclosure shall fall within the protection scope of the present disclosure.

What is claimed is:

1. A service signal processing method, the method being applied to customer-premises equipment (CPE), and the method comprising:
    obtaining signal strength information of a current service antenna corresponding to a current service;
    obtaining a first idle timeslot of a current-service signal frame structure and a second idle timeslot of another-service signal frame structure;
    obtaining a synchronization moment of the first idle timeslot and the second idle timeslot;
    controlling the current service antenna to be disconnected from a radio frequency channel of the current service antenna;
    controlling another service antenna corresponding to another service to be switched to the radio frequency channel of the current service antenna at the obtained synchronization moment;
    transmitting a test signal;
    controlling the another service antenna to be disconnected from the radio frequency channel of the current service antenna;
    controlling the current service antenna to be switched back to the radio frequency channel of the current service antenna;
    determining signal strength information of the another service antenna according to a transmitting result of the test signal;
    selecting a working antenna according to the signal strength information of the current service antenna and the signal strength information of the another service antenna; and
    controlling the working antenna to process a service signal of the current service using the radio frequency channel of the current service antenna, and
    the method further comprising one of the following:
        the current-service signal frame structure has a receive-send interval, the another-service signal frame structure has the receive-send interval, and obtaining the first idle timeslot of the current-service signal frame structure and the second idle timeslot of the another-service signal frame structure comprises:
            determining a first receive-send interval of the current-service signal frame structure;
            using the first receive-send interval as the first idle timeslot of the current-service signal frame structure;
            determining a second receive-send interval of the another-service signal frame structure; and
            using the second receive-send interval as the second idle timeslot of the another-service signal frame structure, and
            obtaining the synchronization moment of the first idle timeslot and the second idle timeslot comprises:
                obtaining a synchronization moment of the first receive-send interval and the second receive-send interval; and using the synchronization moment of the first receive-send interval and the second receive-send interval as the synchronization moment of the first idle timeslot and the second idle timeslot, or the current-service signal frame structure has the receive-send interval, the another-service signal frame structure does not have the receive-send interval, and obtaining the first idle timeslot of the current-service signal frame structure and the second idle timeslot of the another-service signal frame structure comprises:
   determining a third receive-send interval of the current-service signal frame structure;
   using the third receive-send interval as the first idle timeslot of the current-service signal frame structure;
   determining a first blank subframe in the another-service signal frame structure;
   using the first blank subframe as the second idle timeslot of the another-service signal frame structure, and
   obtaining the synchronization moment of the first idle timeslot and the second idle timeslot comprises:
      searching the first blank subframe for a synchronization moment with the third receive-send interval; and
      using the found synchronization moment as the synchronization moment of the first idle timeslot and the second idle timeslot, or the current-service signal frame structure does not have the receive-send interval, the another-service signal frame structure has the receive-send interval, and obtaining the first idle timeslot of the current-service signal frame structure and the second idle timeslot of the another-service signal frame structure comprises:
   determining a second blank subframe in the current-service signal frame structure;
   using the second blank subframe as the first idle timeslot of the current-service signal frame structure;
   determining a fourth receive-send interval of the another-service signal frame structure; and
   using the fourth receive-send interval as the second idle timeslot of the another-service signal frame structure, and
   obtaining the synchronization moment of the first idle timeslot and the second idle timeslot comprises:
      searching the second blank subframe for a synchronization moment with the fourth receive-send interval; and
      using the found synchronization moment as the synchronization moment of the first idle timeslot and the second idle timeslot, or the current-service signal frame structure does not have the receive-send interval, the another-service signal frame structure does not have the receive-send interval, and obtaining the first idle timeslot of the current-service signal frame structure and the second idle timeslot of the another-service signal frame structure comprises:
   determining a third blank subframe in the current-service signal frame structure;
   using the third blank subframe as the first idle timeslot of the current-service signal frame structure;
   determining a fourth blank subframe in the another-service signal frame structure; and
   using the fourth blank subframe as the second idle timeslot of the another-service signal frame structure, and
   obtaining the synchronization moment of the first idle timeslot and the second idle timeslot comprises:
      determining a synchronization moment of the third blank subframe and the fourth blank subframe; and
      using the synchronization moment of the third blank subframe and the fourth blank subframe as the synchronization moment of the first idle timeslot and the second idle timeslot.

2. The method of claim 1, wherein the working antenna is not the current service antenna, and before controlling the working antenna to process the service signal of the current service using the radio frequency channel of the current service antenna, the method further comprises:
   controlling the current service antenna to be disconnected from the radio frequency channel of the current service antenna; and
   controlling the working antenna to be switched to the radio frequency channel of the current service antenna.

3. The method of claim 2, wherein before controlling the working antenna to be switched to the radio frequency channel of the current service antenna, the method further comprises:
   determining whether the working antenna meets a switching condition; and
   performing the step of controlling the working antenna to be switched to the radio frequency channel of the current service antenna when the working antenna meets the switching condition.

4. The method of claim 1, wherein after selecting the working antenna according to the signal strength information of the current service antenna and the signal strength information of the another service antenna, the method further comprises:
   regularly polling the signal strength information of the current service antenna and the signal strength information of the another service antenna; and
   updating, according to the signal strength information of the current service antenna and the signal strength information of the another service antenna that are obtained by polling, the working antenna that processes the service signal of the current service.

5. Customer-premises equipment comprising:
   a memory comprising instructions; and
   a processor coupled to the memory, the instructions causing the processor to be configured to:
      obtain signal strength information of a current service antenna corresponding to a current service;
      obtain a first idle timeslot of a current-service signal frame structure and a second idle timeslot of another-service signal frame structure;
      obtain a synchronization moment of the first idle timeslot and the second idle timeslot;
      control the current service antenna to be disconnected from a radio frequency channel of the current service antenna;

control another service antenna corresponding to another service to be switched to the radio frequency channel of the current service antenna at the obtained synchronization moment;
transmit a test signal;
control the another service antenna to be disconnected from the radio frequency channel of the current service antenna;
control the current service antenna to be switched back to the radio frequency channel of the current service antenna;
determine signal strength information of the another service antenna according to a transmitting result of the test signal;
select a working antenna according to the signal strength information of the current service antenna and the signal strength information of the another service antenna; and
control the working antenna to process a service signal of the current service using the radio frequency channel of the current service antenna, and the customer-premises equipment further comprising one of the following:
the current-service signal frame structure has a receive-send interval, the another-service signal frame structure has the receive-send interval, and the instructions further cause the processor to be configured to:
 determine a first receive-send interval of the current-service signal frame structure;
 use the first receive-send interval as the first idle timeslot of the current-service signal frame structure;
 determine a second receive-send interval of the another-service signal frame structure;
 use the second receive-send interval as the second idle timeslot of the another-service signal frame structure;
 obtain a synchronization moment of the first receive-send interval and the second receive-send interval; and
 use the synchronization moment of the first receive-send interval and the second receive-send interval as the synchronization moment of the first idle timeslot and the second idle timeslot, or
the current-service signal frame structure has the receive-send interval, the another-service signal frame structure does not have the receive-send interval, and the instructions further cause the processor to be configured to:
 determine a third receive-send interval of the current-service signal frame structure;
 use the third receive-send interval as the first idle timeslot of the current-service signal frame structure;
 determine a first blank subframe in the another-service signal frame structure;
 use the first blank subframe as the second idle timeslot of the another-service signal frame structure;
 search the first blank subframe for a synchronization moment with the third receive-send interval; and
 use the found synchronization moment as the synchronization moment of the first idle timeslot and the second idle timeslot, or
the current-service signal frame structure does not have the receive-send interval, the another-service signal frame structure has the receive-send interval, and the instructions further cause the processor to be configured to:
 determine a second blank subframe in the current-service signal frame structure;
 use the second blank subframe as the first idle timeslot of the current-service signal frame structure;
 determine a fourth receive-send interval of the another-service signal frame structure;
 use the fourth receive-send interval as the second idle timeslot of the another-service signal frame structure;
 search the second blank subframe for a synchronization moment with the fourth receive-send interval; and
 use the found synchronization moment as the synchronization moment of the first idle timeslot and the second idle timeslot, or
the current-service signal frame structure does not have the receive-send interval, the another-service signal frame structure does not have the receive-send interval, and the instructions further cause the processor to be configured to:
 determine a third blank subframe in the current-service signal frame structure;
 use the third blank subframe as the first idle timeslot of the current-service signal frame structure;
 determine a fourth blank subframe in the another-service signal frame structure;
 use the fourth blank subframe as the second idle timeslot of the another-service signal frame structure;
 determine a synchronization moment of the third blank subframe and the fourth blank subframe; and
 use the synchronization moment of the third blank subframe and the fourth blank subframe as the synchronization moment of the first idle timeslot and the second idle timeslot.

6. The customer-premises equipment of claim 5, wherein the working antenna is not the current service antenna, and the instructions further cause the processor to be configured to:
control the current service antenna to be disconnected from the radio frequency channel of the current service antenna; and
control the working antenna to be switched to the radio frequency channel of the current service antenna.

7. The customer-premises equipment of claim 6, wherein the instructions further cause the processor to be configured to:
determine whether the working antenna meets a switching condition; and
control the working antenna to be switched to the radio frequency channel of the current service antenna when the working antenna meets the switching condition.

8. The customer-premises equipment of claim 5, wherein the instructions further cause the processor to be configured to:
regularly poll the signal strength information of the current service antenna and the signal strength information of the another service antenna; and
update, according to the signal strength information of the current service antenna and the signal strength information of the another service antenna that are obtained by polling, the working antenna that processes the service signal of the current service.

* * * * *